United States Patent
Zhu et al.

(10) Patent No.: US 11,425,600 B2
(45) Date of Patent: Aug. 23, 2022

(54) WIRELESS BACKHAUL DATA TRANSMISSION METHOD AND APPARATUS

(71) Applicant: HUAWEI TECHNOLOGIES CO., LTD., Guangdong (CN)

(72) Inventors: Yuanping Zhu, Shanghai (CN); You Li, Shenzhen (CN); Jing Liu, Shanghai (CN); Rui Wang, Shanghai (CN); Shitong Yuan, Chengdu (CN); Mingzeng Dai, Shenzhen (CN)

(73) Assignee: Huawei Technologies Co., Ltd., Guangdong (CN)

(*) Notice: Subject to any disclaimer, the term of this patent is extended or adjusted under 35 U.S.C. 154(b) by 0 days.

(21) Appl. No.: 17/062,190

(22) Filed: Oct. 2, 2020

(65) Prior Publication Data

US 2021/0022040 A1    Jan. 21, 2021

Related U.S. Application Data

(63) Continuation of application No. PCT/CN2019/081321, filed on Apr. 3, 2019.

(30) Foreign Application Priority Data

Apr. 4, 2018    (CN) .......................... 201810302364.3

(51) Int. Cl.
*H04W 28/06* (2009.01)
*H04L 1/18* (2006.01)
(Continued)

(52) U.S. Cl.
CPC ......... *H04W 28/065* (2013.01); *H04L 1/1806* (2013.01); *H04W 28/0268* (2013.01); *H04W 80/02* (2013.01)

(58) Field of Classification Search
CPC .......... H04L 1/189; H04L 1/22; H04W 28/06; H04W 28/065; H04W 84/047; H04W 92/10
See application file for complete search history.

(56) References Cited

U.S. PATENT DOCUMENTS

2009/0029645 A1* 1/2009 Leroudier ........... H04W 84/047
                                                          455/7
2016/0149804 A1    5/2016 Mirza
(Continued)

FOREIGN PATENT DOCUMENTS

CN    101742695 A    6/2010
CN    104601280 A    5/2015
(Continued)

OTHER PUBLICATIONS

Extended European Search Report issued in European Application No. 19781660.6 dated Apr. 1, 2021, 10.
(Continued)

*Primary Examiner* — Pao Sinkantarakorn
(74) *Attorney, Agent, or Firm* — Fish & Richardson P.C.

(57) ABSTRACT

This application provides a data transmission method and apparatus, to reduce wastes of transmission resources. The method includes: receiving, by a first node, a data packet from an air interface, where the first node is a wireless backhaul node, and the wireless backhaul node is configured to provide a wireless backhaul service for a node that wirelessly accesses the wireless backhaul node; duplicating, by the first node, the data packet to obtain M data packets, where M is an integer greater than 1; and splitting, by the first node, the M data packets, and sending the M data packets to a second node through at least two paths. This application relates to the field of communications technologies.

17 Claims, 13 Drawing Sheets

(51) Int. Cl.
  *H04W 28/02* (2009.01)
  *H04W 80/02* (2009.01)

(56) References Cited

U.S. PATENT DOCUMENTS

| | | | |
|---|---|---|---|
| 2017/0164187 A1* | 6/2017 | Lu | H04W 8/24 |
| 2018/0279262 A1* | 9/2018 | Babaei | H04L 1/1848 |
| 2019/0028918 A1* | 1/2019 | Zhu | H04W 28/065 |
| 2019/0254117 A1* | 8/2019 | Chen | H04W 28/06 |

FOREIGN PATENT DOCUMENTS

| | | |
|---|---|---|
| CN | 105703891 A | 6/2016 |
| CN | 105704197 A | 6/2016 |
| CN | 106254238 A | 12/2016 |
| CN | 107438976 A | 12/2017 |
| WO | 2017220855 A1 | 12/2017 |

OTHER PUBLICATIONS

Huawei, HiSilicon, "Support of Multi-Connectivity in NR," 3GPP TSG-RAN WG2 #97, R2-1701215, Athens, Greece, Feb. 13-17, 2017, 4 pages.

Huawei, HiSilicon, "Evaluation on packet duplication in multi-connectivity," 3GPP TSG-RAN2 NR Ad Hoc, R2-1700172, Spokane, Washington, USA, Jan. 17-19, 2017, 7 pages.

Oppo, "Discussion on redundant connectivity support in IAB," 3GPP TSG-RAN2 Meeting AH#1, R2-1800157, Vancouver, Canada, Jan. 22-26, 2018, 3 pages.

Huawei, "Destination Address and Forwarding Path based Routing for IAB," 3GPP TSG-RAN WG3 Meeting #99, R3-180816, Athens, Greece, Feb. 26-Mar. 2, 2018, 4 pages.

Huawei, "Data forwarding in NR," 3GPP TSG-RAN WG3 Meeting#97, R3-173021, Berlin, Germany, Aug. 21-25, 2017, 4 pages.

InterDigital Communications, "Packet Duplication at PDCP," 3GPP TSG-RAN WG2 Meeting #97, R2-1701186, Athens, Greece, Feb. 13-17, 2017, 2 pages.

Office Action issued in Chinese Application No. 201810302364.3 dated Mar. 25, 2020, 25 pages (with English translation).

PCT International Search Report and Written Opinion issued in International Application No. PCT/CN2019/081321 dated Jul. 8, 2019, 15 pages (with English translation).

\* cited by examiner

WIRELESS BACKHAUL DATA TRANSMISSION METHOD AND APPARATUS

CROSS-REFERENCE TO RELATED APPLICATIONS

This application is a continuation of International Application No. PCT/CN2019/081321, filed on Apr. 3, 2019, which claims priority to Chinese Patent Application No. 201810302364.3, filed on Apr. 4, 2018. The disclosures of the aforementioned applications are hereby incorporated by reference in their entireties.

TECHNICAL FIELD

This application relates to the field of communications technologies, and in particular, to a data transmission method and apparatus.

BACKGROUND

In a current standard of a 5th-generation (5G) wireless communications system, in a carrier aggregation (CA) or dual connectivity (DC) scenario, in consideration of a requirement for service transmission reliability, duplication may be performed on a data packet. For example, downlink data is transmitted in the DC scenario. When there are two paths between a base station and a terminal, the base station duplicates a data packet 1 at a packet data convergence protocol (PDCP) layer to obtain two data packets 1, and sends the two data packets 1 to the terminal through the two paths. After receiving the data packets 1, the terminal performs duplicate detection on the data packets at a PDCP layer of the terminal. If detecting a duplicate data packet, the terminal discards (which may also be referred to as deletes) the duplicate data packet.

Referring to FIG. 1, in an integrated access and backhaul (IAB) scenario, there may be two paths between a terminal and a donor base station, and the two paths are respectively: donor base station-IAB node 1-IAB node 2-IAB node 4-terminal, and donor base station-IAB node 1-IAB node 3-IAB node 4-terminal. There are common links between the two paths: a link between the terminal and the IAB node 4 and a link between the donor base station and the IAB node 1. Since there is only one link between the terminal and the IAB node 4 and between the donor base station and the IAB node 1, if duplicate data packets are transmitted over the link between the terminal and the IAB node 4 and the link between the donor base station and the IAB node 1 by using same carriers, transmission resources are wasted.

SUMMARY

Embodiments of this application provide a data transmission method and apparatus, to reduce wastes of transmission resources.

To achieve the foregoing objective, the embodiments of this application provide the following technical solutions.

According to a first aspect, a data transmission method is provided. The method includes: receiving, by a first node, a data packet, where the first node is a wireless backhaul node or an access network device, the wireless backhaul node is configured to provide a wireless backhaul service for a node that wirelessly accesses the wireless backhaul node, and the first node receives the data packet from the air interface when the first node is a wireless backhaul node; duplicating, by the first node, the data packet to obtain M data packets, where M is an integer greater than 1; and splitting, by the first node, the M data packets, and sending the M data packets to a second node through at least two paths. According to the method provided in the first aspect, the data packet is duplicated at a splitting node of the data packets, and/or duplicate detection is performed on the data packets at an aggregation node of the data packets. In an IAB scenario shown in FIG. 1, transmission of the duplicate data packet over a link between a terminal and an IAB node 4 and/or over a link between a DgNB and an IAB node 1 may be avoided. Compared with the prior art, in this method, resource utilization can be improved.

In a possible design, at least two of the M data packets are aggregated at the second node.

In a possible design, the duplicating, by the first node, the data packet to obtain M data packets includes: when determining that the data packet meets a preset condition, duplicating, by the first node, the data packet to obtain the M data packets, where that the data packet meets a preset condition includes at least one of the following cases: the data packet is a data packet of a specified terminal; the data packet is a data packet received from a specified wireless backhaul node, a data packet sent to a specified wireless backhaul node, or a data packet received from a specified wireless backhaul node and sent to a specified wireless backhaul node; the data packet is a data packet born on a specified radio bearer of a specified terminal; the data packet is a data packet born on a specified PDU session of a specified terminal; the data packet is a data packet in a specified QoS flow of a specified terminal; and the data packet is a data packet carrying first indication information, where the first indication information is used to indicate that a packet loss rate of the data packet is less than or equal to a preset threshold. In this possible implementation, a network may enable a duplication function for a specific data packet, to meet a QoS requirement of a service corresponding to the data packet.

In a possible design, the data packet is duplicated at a first protocol layer of the first node to obtain the M data packets, and the splitting, by the first node, the M data packets, and sending the M data packets to a second node through at least two paths includes: splitting, by the first node, the M data packets, and sending, at the first protocol layer of the first node, the M data packets to the second node via peer first protocol layers of the first node on the at least two paths, where the first protocol layers have at least one of the following capabilities: adding routing information that can be identified by a wireless backhaul node to the data packet; selecting routing based on the routing information that can be identified by the wireless backhaul node; adding identification information that can be identified by the wireless backhaul node and that is related to a QoS requirement to the data packet; performing QoS mapping on a link including the wireless backhaul node for the data packet; adding data packet type indication information to the data packet; and sending flow control feedback information to a node having a flow control capability. In this possible implementation, when a protocol stack of the first node includes the first protocol layer, the duplication operation may be performed on a node splitting the plurality of data packets, to avoid transmission of a redundant data packet over a common link between a terminal or an access network base station and the wireless backhaul node.

In a possible design, that the data packet meets a preset condition includes at least one of the following cases: the data packet is the data packet of the specified terminal; the data packet is the data packet received from the specified wireless backhaul node, the data packet sent to the specified wireless backhaul node, or the data packet received from the specified wireless backhaul node and sent to the specified wireless backhaul node; the data packet is the data packet born on the specified radio bearer of the specified terminal; and the data packet is the data packet carrying the first indication information. In this possible implementation, QoS guarantee capabilities of data packets that meet different conditions or a QoS guarantee capability of a service to which the data packet belongs can be ensured. For example, a QoS guarantee capability of data transmission of a service of the specified terminal can be improved; when any path between some specific nodes cannot meet a QoS requirement of a data packet needing to be transmitted, duplicate transmission may be performed through another path, so that a QoS guarantee capability of data transmission between these specific nodes can be improved; a QoS guarantee capability of data transmission of a specified service of the specified terminal can be improved; a QoS guarantee capability of transmission of a specified data packet can be improved.

In a possible design, the data packet is a data packet of a terminal, a wireless backhaul node accessed by the terminal and a user plane function (UPF) serving the terminal each have a peer GTP layer, and the terminal and the wireless backhaul node accessed by the terminal each have a peer SDAP layer and a peer PDCP layer; and that the data packet meets a preset condition includes at least one of the following cases: the data packet is the data packet of the specified terminal; the data packet is the data packet received from the specified wireless backhaul node, the data packet sent to the specified wireless backhaul node, or the data packet received from the specified wireless backhaul node and sent to the specified wireless backhaul node; and the data packet is the data packet carrying the first indication information. In this possible implementation, QoS guarantee capabilities of data packets that meet different conditions or a QoS guarantee capability of a service to which the data packet belongs can be ensured.

In a possible design, the first node is a wireless backhaul node, and the second node is an access network device; or the first node is an access network device, and the second node is a wireless backhaul node; the data packet is duplicated at a GTP layer of the first node to obtain the M data packets, and the splitting, by the first node, the M data packets, and sending the M data packets to a second node through at least two paths includes: splitting, by the first node, the M data packets, and sending, at the GTP layer of the first node, the M data packets to the second node via peer GTP layers of the first node on the at least two paths. In this possible implementation, when a protocol stack of the first node includes the GTP layer, the duplication operation may be performed on a node splitting the plurality of data packets, to avoid transmission of a redundant data packet over a common link between a terminal or an access network base station and the wireless backhaul node. In a possible design, before the duplicating, by the first node, the data packet to obtain M data packets, the method further includes: receiving, by the first node, second indication information, where the second indication information is used to indicate whether to activate a data duplication function of the first node; and when the second indication information is used to indicate to activate the data duplication function of the first node, activating, by the first node, the data duplication function of the first node according to the second indication information. In this possible implementation, the duplication function may be flexibly enabled or disabled based on dynamic changes of a network status and service requirement.

In a possible design, the data packet includes a data packet identifier used by the second node to identify the data packet, and data packet identifiers of the M data packets are the same. This possible implementation facilitates the second node to perform duplicate detection on the data packet.

In a possible design, the data packet is a data packet of a terminal, and a GTP tunnel between the first node and the second node one-to-one corresponds to a radio bearer of the terminal; that the data packet meets a preset condition includes at least one of the following cases: the data packet is the data packet of the specified terminal; the data packet is the data packet received from the specified wireless backhaul node, the data packet sent to the specified wireless backhaul node, or the data packet received from the specified wireless backhaul node and sent to the specified wireless backhaul node; the data packet is the data packet born on the specified radio bearer of the specified terminal; and the data packet is the data packet carrying the first indication information. In this possible implementation, QoS guarantee capabilities of data packets that meet different conditions or a QoS guarantee capability of a service to which the data packet belongs can be ensured.

In a possible design, the data packet is a data packet of a terminal, and GTP tunnels between the first node and the second node one-to-one correspond to PDU sessions of the terminal; that the data packet meets a preset condition includes at least one of the following cases: the data packet is the data packet of the specified terminal; the data packet is the data packet received from the specified wireless backhaul node, the data packet sent to the specified wireless backhaul node, or the data packet received from the specified wireless backhaul node and sent to the specified wireless backhaul node; the data packet is the data packet born on the specified PDU session of the specified terminal; the data packet is the data packet in the specified QoS flow of the specified terminal; and the data packet is the data packet carrying the first indication information. In this possible implementation, QoS guarantee capabilities of data packets that meet different conditions or a QoS guarantee capability of a service to which the data packet belongs can be ensured.

In a possible design, the first node is a wireless backhaul node, the data packet is a data packet of a terminal, and the second node is a terminal or an access network device; the data packet is duplicated at a PDCP layer of the first node to obtain the M data packets, and the splitting, by the first node, the M data packets, and sending the M data packets to a second node through at least two paths includes: splitting, by the first node, the M data packets, and sending, at the PDCP layer of the first node, the M data packets to the second node through the at least two paths. In this possible implementation, when a protocol stack of the first node includes the PDCP layer, the duplication operation may be performed on a node splitting the plurality of data packets, to avoid transmission of a redundant data packet over a common link between a terminal or an access network base station and the wireless backhaul node.

In a possible design, that the data packet meets a preset condition includes: the data packet is the data packet born on the specified radio bearer of the specified terminal. In this possible implementation, a QoS assurance capability of a service or data packet born on the specified radio bearer of the specified terminal can be ensured. In a possible design, before the duplicating, by the first node, the data packet to obtain M data packets, the method further includes: receiving, by the first node, configuration information, where the configuration information includes the preset condition.

According to a second aspect, a data transmission method is provided. The method includes: receiving, by a second node, at least two data packets through at least one path, where the second node is a wireless backhaul node or an access network device, the wireless backhaul node is configured to provide a wireless backhaul service for a node that wirelessly accesses the wireless backhaul node, and the at least one path is a path between the second node and a first node; and performing, by the second node, duplicate detection on at least one of the at least two data packets. According to the method provided in the second aspect, the data packet is duplicated at a splitting node of the data packets, and/or duplicate detection is performed on the data packets at an aggregation node of the data packets. In an IAB scenario shown in FIG. 1, transmission of the duplicate data packet over a link between a terminal and an IAB node 4 and/or over a link between a DgNB and an IAB node 1 may be avoided. Compared with the prior art, in this method, resource utilization can be improved.

In a possible design, the at least one data packet is a data packet that is in the at least two data packets and that meets a preset condition, where that the data packet meets the preset condition includes at least one of the following cases: the data packet is a data packet of a specified terminal; the data packet is a data packet received from a specified wireless backhaul node, a data packet sent to a specified wireless backhaul node, or a data packet received from a specified wireless backhaul node and sent to a specified wireless backhaul node; the data packet is a data packet born on a specified radio bearer of a specified terminal; the data packet is a data packet born on a specified PDU session of a specified terminal; the data packet is a data packet in a specified QoS flow of a specified terminal; and the data packet is a data packet carrying first indication information, where the first indication information is used to indicate that a packet loss rate of the data packet is less than or equal to a preset threshold. In this possible implementation, a network may enable a duplication function for a specific data packet, to meet a QoS requirement of a service corresponding to the data packet.

In a possible design, the at least one data packet is a data packet received by the second node at a first protocol layer of the second node via a peer first protocol layer of the second node, and the performing, by the second node, duplicate detection on at least one of the at least two data packets includes: performing, by the second node, duplicate detection on at least one of the at least two data packets at the first protocol layer of the second node, where the first protocol layers have at least one of the following capabilities: adding routing information that can be identified by a wireless backhaul node to the data packet; selecting routing based on the routing information that can be identified by the wireless backhaul node; adding identification information that can be identified by the wireless backhaul node and that is related to a QoS requirement to the data packet; performing QoS mapping on a link including the wireless backhaul node for the data packet; adding data packet type indication information to the data packet; and sending flow control feedback information to a node having a flow control capability. In this possible implementation, when a protocol stack of the first node includes the first protocol layer, the duplication operation may be performed on a node splitting the plurality of data packets, to avoid transmission of a redundant data packet over a common link between a terminal or an access network base station and the wireless backhaul node.

In a possible design, that the data packet meets the preset condition includes at least one of the following cases: the data packet is the data packet of the specified terminal; the data packet is the data packet received from the specified wireless backhaul node, the data packet sent to the specified wireless backhaul node, or the data packet received from the specified wireless backhaul node and sent to the specified wireless backhaul node; the data packet is the data packet born on the specified radio bearer of the specified terminal; and the data packet is the data packet carrying the first indication information. In this possible implementation, QoS guarantee capabilities of data packets that meet different conditions or a QoS guarantee capability of a service to which the data packet belongs can be ensured. For example, a QoS guarantee capability of data transmission of a service of the specified terminal can be improved; when any path between some specific nodes cannot meet a QoS requirement of a data packet needing to be transmitted, duplicate transmission may be performed through another path, so that a QoS guarantee capability of data transmission between these specific nodes can be improved; a QoS guarantee capability of data transmission of a specified service of the specified terminal can be improved; a QoS guarantee capability of transmission of a specified data packet can be improved.

In a possible design, the data packet is a data packet of a terminal, a wireless backhaul node accessed by the terminal and a UPF serving the terminal each have a peer GTP layer, and the terminal and the wireless backhaul node accessed by the terminal each have a peer SDAP layer and a peer PDCP layer; and that the data packet meets the preset condition includes at least one of the following cases: the data packet is the data packet of the specified terminal; the data packet is the data packet received from the specified wireless backhaul node, the data packet sent to the specified wireless backhaul node, or the data packet received from the specified wireless backhaul node and sent to the specified wireless backhaul node; and the data packet is the data packet carrying the first indication information. In this possible implementation, QoS guarantee capabilities of data packets that meet different conditions or a QoS guarantee capability of a service to which the data packet belongs can be ensured.

In a possible design, the first node is an access network device, and the second node is a wireless backhaul node; or the first node is a wireless backhaul node, and the second node is an access network device; the at least one data packet is a data packet received by the second node at a GTP layer of the second node via a peer GTP layer of the second node, and the performing, by the second node, duplicate detection on at least one of the at least two data packets includes: performing, by the second node, duplicate detection on at least one of the at least two data packets at the GTP layer of the second node. In this possible implementation, when a protocol stack of the first node includes the GTP layer, the duplication operation may be performed on a node splitting the plurality of data packets, to avoid transmission of a redundant data packet over a common link between a terminal or an access network base station and the wireless backhaul node.

In a possible design, the data packet includes a data packet identifier of the data packet, and data packet identifiers of same data packets are the same; the performing, by the second node, duplicate detection on at least one of the at least two data packets includes: performing, by the second node, duplicate detection on at least one of the at least two data packets based on the data packet identifier of the data packet. This possible implementation facilitates the second node to perform duplicate detection on the data packet.

In a possible design, the data packet is a data packet of a terminal, and a GTP tunnel between the first node and the second node one-to-one corresponds to a radio bearer of the terminal; that the data packet meets the preset condition includes at least one of the following cases: the data packet is the data packet of the specified terminal; the data packet is the data packet received from the specified wireless backhaul node, the data packet sent to the specified wireless backhaul node, or the data packet received from the specified wireless backhaul node and sent to the specified wireless backhaul node; the data packet is the data packet born on the specified radio bearer of the specified terminal; and the data packet is the data packet carrying the first indication information. In this possible implementation, QoS guarantee capabilities of data packets that meet different conditions or a QoS guarantee capability of a service to which the data packet belongs can be ensured.

In a possible design, the data packet is a data packet of a terminal, and GTP tunnels between the first node and the second node one-to-one correspond to PDU sessions of the terminal; that the data packet meets the preset condition includes at least one of the following cases: the data packet is the data packet of the specified terminal; the data packet is the data packet received from the specified wireless backhaul node, the data packet sent to the specified wireless backhaul node, or the data packet received from the specified wireless backhaul node and sent to the specified wireless backhaul node; the data packet is the data packet born on the specified PDU session of the specified terminal; the data packet is the data packet in the specified QoS flow of the specified terminal; and the data packet is the data packet carrying the first indication information. In this possible implementation, QoS guarantee capabilities of data packets that meet different conditions or a QoS guarantee capability of a service to which the data packet belongs can be ensured.

In a possible design, that the data packet meets the preset condition includes: the data packet is the data packet born on the specified radio bearer of the specified terminal. In this possible implementation, a QoS assurance capability of a service or data packet born on the specified radio bearer of the specified terminal can be ensured.

In a possible design, before the performing, by the second node, duplicate detection on at least one of the at least two data packets, the method further includes: receiving, by the second node, configuration information, where the configuration information includes the preset condition.

According to a third aspect, a data packet processing method is provided. The method includes: sending, by a first node, a plurality of same data packets to a second node through N paths between the first node and the second node; receiving, by the first node, feedback information from the second node, where the feedback information is used to indicate that a data packet is correctly received, and the data packet is a data packet in the plurality of data packets; and sending, by the first node via a first protocol layer of the first node, third indication information to at least one node that is on the N paths and on which a first protocol layer is deployed, where the third indication information is used to indicate to discard the data packet; where one of the first node and the second node is a wireless backhaul node, and the other node is an access network device; or both the first node and the second node are wireless backhaul nodes; the first protocol layers have at least one of the following capabilities: adding routing information that can be identified by a wireless backhaul node to the data packet, selecting routing based on the routing information that can be identified by the wireless backhaul node, adding identification information that can be identified by the wireless backhaul node and that is related to a QoS requirement to the data packet, performing QoS mapping for the data packet on a link including the wireless backhaul node, adding data packet type indication information to the data packet, and sending flow control feedback information to a node having a flow control capability. According to the method provided in the third aspect, after the second node receives the data packet, the first node sends the third indication information to the at least one node on the N paths, and the at least one node may discard a duplicate data packet according to the third indication information, so that the at least one node may not need to send, to the second node, a data packet that has been received by the second node, to save transmission resources. In addition, the third indication information is transmitted via the first protocol layer, and an existing protocol stack of a terminal does not need to be changed, so that the existing terminal is compatible.

In a possible design, the feedback information is specifically used to indicate that the second node correctly receives data packets sent by the first node through N1 paths, where the N1 paths are paths in the N paths, and N1 is an integer greater than 0 and less than N; and the sending, by the first node via a first protocol layer of the first node, third indication information to at least one node that is on the N paths and on which a first protocol layer is deployed includes: sending, by the first node via the first protocol layer of the first node, the third indication information to a node that is on N2 paths and on which a first protocol layer is deployed or a node that is on the N paths and on which a first protocol layer is deployed, where the N2 paths are paths that are in the N paths and other than the N1 paths. In this possible implementation, the first node may select to send the third indication information to the node that is on the N2 paths and on which the first protocol layer is deployed, to pertinently send the third indication information to a node on a path through which the data packet is not successfully sent to the second node. This can improve execution efficiency of the method.

In a possible design, the third indication information is a message, a message type of the message indicates to perform a discard operation, and the message includes a data packet identifier of a data packet corresponding to the discard operation.

In a possible design, the message further includes a preset condition that the data packet corresponding to the discard operation meets, and that the data packet meets the preset condition includes at least one of the following cases: the data packet is a data packet of a specified terminal; the data packet is a data packet received from a specified wireless backhaul node, a data packet sent to a specified wireless backhaul node, or a data packet received from a specified wireless backhaul node and sent to a specified wireless backhaul node; the data packet is a data packet born on a specified radio bearer of a specified terminal; the data packet is a data packet born on a specified PDU session of a specified terminal; the data packet is a data packet in a specified QoS flow of a specified terminal; and the data packet is a data packet carrying first indication information, where the first indication information is used to indicate that a packet loss rate of the data packet is less than or equal to a preset threshold. In this possible implementation, data packets that meet different conditions may be deleted, to meet requirements of different services.

According to a fourth aspect, a data packet processing method is provided. The method includes: correctly receiving, by a second node, a data packet from a first node, where the data packet is a data packet in a plurality of same data packets sent by the first node to the second node, and the plurality of data packets are transmitted through N paths between the first node and the second node; and sending, by the second node via a first protocol layer of the second node, third indication information to at least one node that is on the N paths and on which a first protocol layer is deployed, where the third indication information is used to indicate to discard the data packet; where one of the first node and the second node is a wireless backhaul node, and the other node is an access network device; or both the first node and the second node are wireless backhaul nodes; the first protocol layers have at least one of the following capabilities: adding routing information that can be identified by a wireless backhaul node to the data packet, selecting routing based on the routing information that can be identified by the wireless backhaul node, adding identification information that can be identified by the wireless backhaul node and that is related to a quality of service QoS requirement to the data packet, performing QoS mapping for the data packet on a link including the wireless backhaul node, adding data packet type indication information to the data packet, and sending flow control feedback information to a node having a flow control capability. According to the method provided in the fourth aspect, after the second node receives the data packet, the second node sends the third indication information to the at least one node on the N paths, and the at least one node may discard a duplicate data packet according to the third indication information, so that the at least one node may not need to send, to the second node, the data packet that has been received by the second node, to save transmission resources. In addition, the third indication information is transmitted via the first protocol layer, and an existing protocol stack of a terminal does not need to be changed, so that the existing terminal is compatible.

In a possible design, the data packet correctly received by the second node from the first node is a data packet sent by the first node through N1 paths, where the N1 paths are paths in the N paths, and N1 is an integer greater than 0 and less than N; and the sending, by the second node via a first protocol layer of the second node, third indication information to at least one node that is on the N paths and on which a first protocol layer is deployed includes: sending, by the second node via the first protocol layer of the second node, the third indication information to a node that is on N2 paths and on which a first protocol layer is deployed or a node that is on the N paths and on which a first protocol layer is deployed, where the N2 paths are paths that are in the N paths and other than the N1 paths. In this possible implementation, the second node may select to send the third indication information to the node that is on the N2 paths and on which the first protocol layer is deployed, to pertinently send the third indication information to a node on a path through which the data packet is not successfully sent to the second node. This can improve execution efficiency of the method.

In a possible design, the third indication information is a message, a message type of the message indicates to perform a discard operation, and the message includes a data packet identifier of a data packet corresponding to the discard operation.

In a possible design, the message further includes a preset condition that the data packet corresponding to the discard operation meets, and that the data packet meets the preset condition includes at least one of the following cases: the data packet is a data packet of a specified terminal; the data packet is a data packet received from a specified wireless backhaul node, a data packet sent to a specified wireless backhaul node, or a data packet received from a specified wireless backhaul node and sent to a specified wireless backhaul node; the data packet is a data packet born on a specified radio bearer of a specified terminal; the data packet is a data packet born on a specified PDU session of a specified terminal; the data packet is a data packet in a specified QoS flow of a specified terminal; and the data packet is a data packet carrying first indication information, where the first indication information is used to indicate that a packet loss rate of the data packet is less than or equal to a preset threshold. In this possible implementation, data packets that meet different conditions may be deleted, to meet requirements of different services.

In a possible design, the second node is configured with information about at least one node. In this possible implementation, the second node sends the third indication information to the at least one node.

In a possible design, the plurality of data packets are a plurality of data packets obtained by duplicating a data packet by the first node, and the method further includes: receiving, by the second node, information used to indicate that the first node has activated a data packet duplication function. In this possible implementation, the second node determines that the data packet received from the first node is a data packet in the plurality of same data packets.

According to a fifth aspect, a data packet processing method is provided. The method includes: receiving, by a third node, third indication information via a first protocol layer of the third node, where the third indication information is used to indicate to discard a data packet; and discarding, by the third node, the data packet according to the third indication information, where the first protocol layer has at least one of the following capabilities: adding routing information that can be identified by a wireless backhaul node to the data packet; selecting routing based on the routing information that can be identified by the wireless backhaul node; adding identification information that can be identified by the wireless backhaul node and that is related to a quality of service QoS requirement to the data packet; performing QoS mapping on a link including the wireless backhaul node for the data packet; adding data packet type indication information to the data packet; and sending flow control feedback information to a node having a flow control capability. According to the method provided in the fifth aspect, after a second node receives the data packet, a first node or the second node sends the third indication information to at least one node on N paths, and the at least one node may discard a duplicate data packet according to the third indication information, so that the at least one node may not need to send, to the second node, a data packet that has been received by the second node, to save transmission resources. In addition, the third indication information is transmitted via the first protocol layer, and an existing protocol stack of a terminal does not need to be changed, so that the existing terminal is compatible.

In a possible design, the third indication information is a message, a message type of the message indicates to perform a discard operation, and the message includes a data packet identifier of a data packet corresponding to the discard operation; and the discarding, by the third node, the data packet according to the third indication information includes: determining, by the third node based on the message type of the message, to perform the discard operation; determining, by the third node based on the data packet identifier in the message, the data packet corresponding to the discard operation; and discarding, by the third node, the data packet corresponding to the discard operation.

In a possible design, the message further includes a preset condition that the data packet corresponding to the discard operation meets, and that the data packet meets the preset condition includes at least one of the following cases: the data packet is a data packet of a specified terminal; the data packet is a data packet received from a specified wireless backhaul node, a data packet sent to a specified wireless backhaul node, or a data packet received from a specified wireless backhaul node and sent to a specified wireless backhaul node; the data packet is a data packet born on a specified radio bearer of a specified terminal; the data packet is a data packet born on a specified PDU session of a specified terminal; the data packet is a data packet in a specified QoS flow of a specified terminal; and the data packet is a data packet carrying first indication information, where the first indication information is used to indicate that a packet loss rate of the data packet is less than or equal to a preset threshold; and the determining, by the third node based on the data packet identifier in the message, the data packet corresponding to the discard operation includes: determining, by the third node based on the data packet identifier in the message and the preset condition that the data packet corresponding to the discard operation meets, the data packet corresponding to the discard operation. In this possible implementation, data packets that meet different conditions may be deleted, to meet requirements of different services.

According to a sixth aspect, a data transmission apparatus is provided, and the apparatus has a function of implementing any method provided in the first aspect. The function may be implemented by hardware, or may be implemented by hardware executing corresponding software. The hardware or the software includes one or more units corresponding to the foregoing function.

According to a seventh aspect, a data transmission apparatus is provided, and the apparatus has a function of implementing any method provided in the second aspect. The function may be implemented by hardware, or may be implemented by hardware executing corresponding software. The hardware or the software includes one or more units corresponding to the foregoing function.

According to an eighth aspect, a data packet processing apparatus is provided. The apparatus includes a communications unit and a processing unit, where the processing unit is configured to control the communications unit to send a plurality of same data packets to a second node through N paths between the apparatus and the second node; the processing unit is further configured to control the communications unit to receive feedback information from the second node, where the feedback information is used to indicate that a data packet is correctly received, and the data packet is a data packet in the plurality of data packets; and the processing unit is further configured to control the communications unit to send, via a first protocol layer of the apparatus, third indication information to at least one node that is on the N paths and on which a first protocol layer is deployed, where the third indication information is used to indicate to discard the data packet; where one of the apparatus and the second node is a wireless backhaul node, and the other node is an access network device; or both the apparatus and the second node are wireless backhaul nodes; the first protocol layers have at least one of the following capabilities: adding routing information that can be identified by a wireless backhaul node to the data packet, selecting routing based on the routing information that can be identified by the wireless backhaul node, adding identification information that can be identified by the wireless backhaul node and that is related to a QoS requirement to the data packet, performing QoS mapping for the data packet on a link including the wireless backhaul node, adding data packet type indication information to the data packet, and sending flow control feedback information to a node having a flow control capability.

In a possible design, the feedback information is specifically used to indicate that the second node correctly receives the data packet sent by the apparatus through N1 paths, where the N1 paths are paths in the N paths, and N1 is an integer greater than 0 and less than N; and the processing unit is specifically configured to control the communications unit to send, via the first protocol layer of the apparatus, the third indication information to a node that is on N2 paths and on which a first protocol layer is deployed or a node that is on the N paths and on which a first protocol layer is deployed, where the N2 paths are paths that are in the N paths and other than the N1 paths.

In a possible design, the third indication information is a message, a message type of the message indicates to perform a discard operation, and the message includes a data packet identifier of a data packet corresponding to the discard operation.

In a possible design, the message further includes a preset condition that the data packet corresponding to the discard operation meets, and that the data packet meets the preset condition includes at least one of the following cases: the data packet is a data packet of a specified terminal; the data packet is a data packet received from a specified wireless backhaul node, a data packet sent to a specified wireless backhaul node, or a data packet received from a specified wireless backhaul node and sent to a specified wireless backhaul node; the data packet is a data packet born on a specified radio bearer of a specified terminal; the data packet is a data packet born on a specified PDU session of a specified terminal; the data packet is a data packet in a specified QoS flow of a specified terminal; and the data packet is a data packet carrying first indication information, where the first indication information is used to indicate that a packet loss rate of the data packet is less than or equal to a preset threshold.

According to a ninth aspect, a data packet processing apparatus is provided. The apparatus includes: a communications unit and a processing unit, where the processing unit is configured to control the communications unit to correctly receive a data packet from a first node, where the data packet is a data packet in a plurality of same data packets sent by the first node to the apparatus, and the plurality of data packets are transmitted through N paths between the first node and the apparatus; and the processing unit is further configured to control the communications unit to send, via a first protocol layer of the apparatus, third indication information to at least one node that is on the N paths and on which a first protocol layer is deployed, where the third indication information is used to indicate to discard the data packet; where one of the first node and the apparatus is a wireless backhaul node, and the other node is an access network device; or both the first node and the apparatus are wireless backhaul nodes; the first protocol layers have at least one of the following capabilities: adding routing information that can be identified by a wireless backhaul node to the data packet, selecting routing based on the routing information that can be identified by the wireless backhaul node, adding identification information that can be identified by the wireless backhaul node and that is related to a quality of service QoS requirement to the data packet, performing QoS mapping for the data packet on a link including the wireless backhaul node, adding data packet type indication information to the data packet, and sending flow control feedback information to a node having a flow control capability.

In a possible design, the data packet correctly received by the apparatus from the first node is a data packet sent by the first node through N1 paths, where the N1 paths are paths in the N paths, and N1 is an integer greater than 0 and less than N; and the processing unit is specifically configured to control the communications unit to send, via the first protocol layer of the apparatus, the third indication information to a node that is on N2 paths and on which a first protocol layer is deployed or a node that is on the N paths and on which a first protocol layer is deployed, where the N2 paths are paths that are in the N paths and other than the N1 paths.

In a possible design, the third indication information is a message, a message type of the message indicates to perform a discard operation, and the message includes a data packet identifier of a data packet corresponding to the discard operation.

In a possible design, the message further includes a preset condition that the data packet corresponding to the discard operation meets, and that the data packet meets the preset condition includes at least one of the following cases: the data packet is a data packet of a specified terminal; the data packet is a data packet received from a specified wireless backhaul node, a data packet sent to a specified wireless backhaul node, or a data packet received from a specified wireless backhaul node and sent to a specified wireless backhaul node; the data packet is a data packet born on a specified radio bearer of a specified terminal; the data packet is a data packet born on a specified PDU session of a specified terminal; the data packet is a data packet in a specified QoS flow of a specified terminal; and the data packet is a data packet carrying first indication information, where the first indication information is used to indicate that a packet loss rate of the data packet is less than or equal to a preset threshold.

In a possible design, the apparatus is configured with information about at least one node.

In a possible design, the plurality of data packets are a plurality of data packets obtained by duplicating a data packet by the first node, and the processing unit is further configured to control the communications unit to receive information used to indicate that the first node has activated a data packet duplication function.

According to a tenth aspect, a data packet processing apparatus is provided. The apparatus includes a communications unit and a processing unit, where the communications unit is configured to receive third indication information via a first protocol layer of the apparatus, where the third indication information is used to indicate to discard a data packet; and the processing unit is configured to discard the data packet according to the third indication information, where the first protocol layer has at least one of the following capabilities: adding routing information that can be identified by a wireless backhaul node to the data packet; selecting routing based on the routing information that can be identified by the wireless backhaul node; adding identification information that can be identified by the wireless backhaul node and that is related to a quality of service QoS requirement to the data packet; performing QoS mapping on a link including the wireless backhaul node for the data packet; adding data packet type indication information to the data packet; and sending flow control feedback information to a node having a flow control capability.

In a possible design, the third indication information is a message, a message type of the message indicates to perform a discard operation, and the message includes a data packet identifier of a data packet corresponding to the discard operation; and the processing unit is specifically configured to: determine, based on the message type of the message, to perform the discard operation; determine, based on the data packet identifier in the message, the data packet corresponding to the discard operation; and discard the data packet corresponding to the discard operation.

In a possible design, the message further includes a preset condition that the data packet corresponding to the discard operation meets, and that the data packet meets the preset condition includes at least one of the following cases: the data packet is a data packet of a specified terminal; the data packet is a data packet received from a specified wireless backhaul node, a data packet sent to a specified wireless backhaul node, or a data packet received from a specified wireless backhaul node and sent to a specified wireless backhaul node; the data packet is a data packet born on a specified radio bearer of a specified terminal; the data packet is a data packet born on a specified protocol data unit PDU session of a specified terminal; the data packet is a data packet in a specified QoS flow of a specified terminal; and the data packet is a data packet carrying first indication information, where the first indication information is used to indicate that a packet loss rate of the data packet is less than or equal to a preset threshold; and the processing unit is specifically configured to determine, based on the data packet identifier in the message and the preset condition that the data packet corresponding to the discard operation meets, the data packet corresponding to the discard operation.

According to an eleventh aspect, an apparatus is provided. The apparatus includes a memory, a processor, at least one communications interface, and a communications bus. The memory is configured to store a computer executable instruction. The processor, the memory, and the at least one communications interface are connected by using the communications bus. The processor executes the computer executable instruction stored in the memory, to enable the apparatus to implement any method provided in any one of the first aspect to the fifth aspect. The apparatus may exist in a product form of a chip.

According to a twelfth aspect, a computer-readable storage medium is provided. The computer-readable storage medium includes an instruction, and when the instruction is run on a computer, the computer is enabled to perform any method provided in any one of the first aspect to the fifth aspect.

According to a thirteenth aspect, a computer program product including an instruction is provided. When the computer program product is run on a computer, the computer is enabled to perform any method provided in any one of the first aspect to the fifth aspect.

For technical effects brought by any design manner in the sixth aspect to the thirteenth aspect, refer to technical effects brought by different design manners in the first aspect to the fifth aspect. Details are not described herein again.

DESCRIPTION OF EMBODIMENTS

Figure 1:
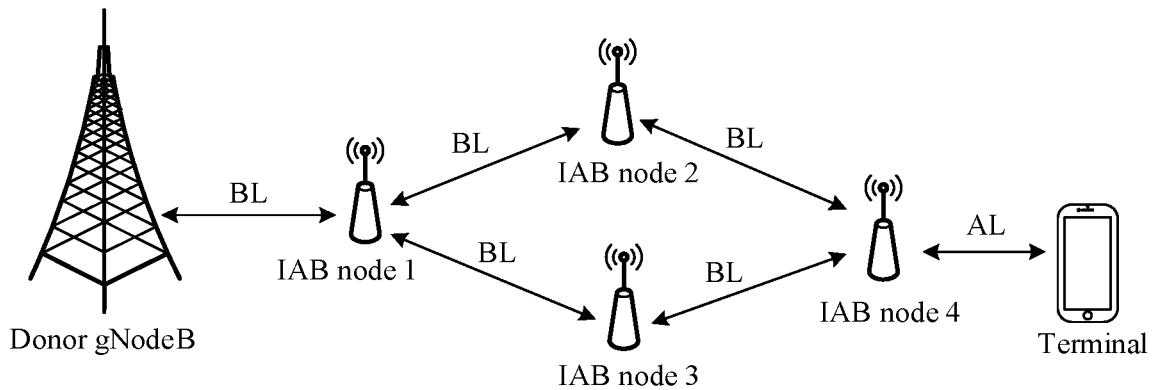
FIG. 1 to FIG. 5 are each a schematic networking diagram of IAB nodes according to an embodiment of this application.

The following describes the technical solutions in embodiments of this application with reference to the accompanying drawings in the embodiments of this application. In descriptions of this application, "/" means "or" unless otherwise specified. For example, A/B may represent A or B. The term "and/or" in this specification describes only an association relationship for associated objects and represents that three relationships may exist. For example, A and/or B may represent the following three cases: Only A exists, both A and B exist, and only B exists. In addition, in the descriptions of this application, "a plurality of" means two or more than two unless otherwise specified. In addition, to clearly describe the technical solutions in the embodiments of this application, the terms such as "first" and "second" are used in the embodiments of this application to distinguish between same items or similar items that have basically same functions and purposes. A person skilled in the art may understand that the terms, such as "first" and "second", are not intended to limit a quantity or an execution sequence; and the terms, such as "first" and "second", do not indicate a definite difference.

The technical solutions in the embodiments of this application may be applied to various communications systems for data processing, for example, a code division multiple access (CDMA) system, a time division multiple access (TDMA) system, a frequency division multiple access (FDMA) system, an orthogonal frequency division multiple access (OFDMA) system, a single-carrier frequency division multiple access (SC-FDMA) system, and another system. The terms "system" and "network" can be interchanged with each other. A wireless technology such as universal terrestrial radio access (UTRA) or CDMA2000 may be implemented in the CDMA system. UTRA may include a wideband CDMA (WCDMA) technology and another variation technology of CDMA. CDMA2000 may cover the interim standard 2000 (IS-2000), the IS-95 standard, and the IS-856 standard. A radio technology such as a global system for mobile communications (GSM) may be implemented in the TDMA system. A radio technology such as evolved universal terrestrial radio access (E-UTRA), ultra-mobile broadband (UMB), IEEE 802.11 (Wi-Fi), IEEE 802.16 (WiMAX), IEEE 802.20, or Flash OFDMA may be implemented in the OFDMA system. UTRA corresponds to UMTS, and E-UTRA corresponds to an evolved release of UMTS. A new release of UMTS, namely, E-UTRA, is used in 3GPP long-term evolution (LTE) and various releases evolved based on LTE. A 5G new radio (NR) communications system is a next-generation communications system that is being studied. In addition, the communications system is further applicable to a future-oriented communications technology, and is applicable to the technical solutions provided in the embodiments of this application.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of a new service scenario, the technical solutions provided in the embodiments of this application are also applicable to similar technical problems. The embodiments of this application are described by using an example in which the provided method is applied to an NR system or a 5G network. However, it should be noted that the method provided in the embodiments of this application may also be applied to another network, for example, may be applied to an evolved packet system (EPS) network (namely, a 4th generation (4G) network). Correspondingly, when the method provided in the embodiments of this application is applied to the EPS network, a network node performing the method provided in the embodiments of this application is replaced with a network node in the EPS network. For example, when the method provided in the embodiments of this application is applied to the 5G network or the NR system, a wireless backhaul node in the following descriptions may be a wireless backhaul node in the 5G network. For example, the wireless backhaul node in the 5G network may be referred to as an IAB node, and certainly may also have another name. This is not specifically limited in the embodiments of this application. When the method provided in the embodiments of this application is applied to the EPS network, a wireless backhaul node in the following descriptions may be a wireless backhaul node in the EPS network. For example, the wireless backhaul node in the EPS network may be referred to as a relay node (RN).

As technologies such as virtual reality (VR), augmented reality (AR), and the internet of things develop, there will be an increasing quantity of terminals in a future network, and network data usage also continuously increases. To cope with the increasing quantity of terminals and extremely rapid growth of the network data usage in a market, a higher requirement is currently posed on a capacity of a 5G network. In a hotspot area, to meet a 5G ultra-high capacity requirement, using high-frequency small cells for networking becomes more popular. High-frequency carriers have a poor propagation characteristic, are severely attenuated by obstacles, and have small coverage. Therefore, a large quantity of small cells need to be densely deployed in the hotspot area. These small cells may be IAB nodes.

To design a flexible and convenient access and backhaul solution, a wireless transmission solution is applied to both an access link (AL) and a backhaul link (BL) in an IAB scenario.

In a network including IAB nodes, the IAB nodes may provide a wireless access service for a terminal, and are connected to a donor node (for example, the donor node may be referred to as a donor gNodeB (DgNB) in a 5G network, namely, a donor gNodeB, and an example in which the donor node is a DgNB is used below to describe the embodiments of this application) over a wireless backhaul link to transmit service data of a user. The DgNB may be a complete entity, or may be in a form in which a centralized unit (CU) is separated from a distributed unit (DU). In other words, the donor base station includes a centralized unit (Donor-CU) and a distributed unit (Donor-DU). The IAB nodes are connected to a core network over a wired link via the donor node (where for example, in a 5G standalone architecture, the IAB nodes are connected to a 5G core network (5GC) over a wired link via the DgNB; and in a 5G non-standalone architecture, an IAB node on a control plane (CP) is connected to an evolved packet core network (EPC) via an eNB (evolved NodeB), and an IAB node on a user plane (UP) is connected to the EPC via the DgNB and the eNB).

The IAB network supports multi-hop IAB node networking and multi-connection IAB node networking. Therefore, there may be a plurality of transmission paths between the terminal and the DgNB. On a path, there is a determined hierarchical relationship between the IAB nodes, and between an IAB node and the DgNB serving the IAB node. Each IAB node considers a node providing a backhaul service for the IAB node as a parent node. Correspondingly, the IAB node may be considered as a child node of the parent node.

Figure 2:
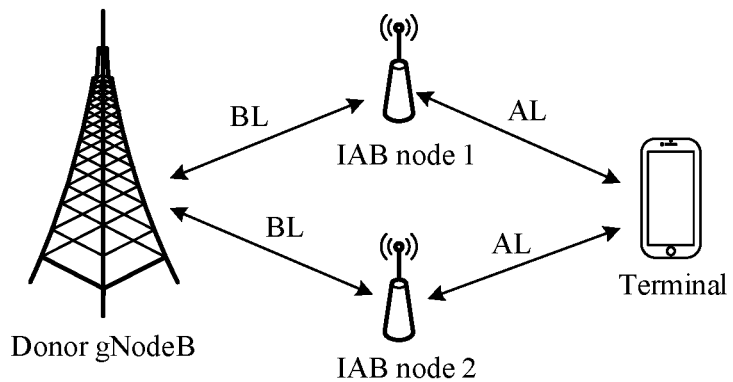

For example, referring to FIG. 2, parent nodes of an IAB node 2 and an IAB node 1 are both a DgNB. After an uplink data packet of a terminal may be transmitted to the DgNB via the IAB node 1 or the IAB node 2, the uplink data packet is sent by the DgNB to a mobile gateway device (for example, a UPF network element in a 5G network). After a downlink data packet is received by the DgNB from the mobile gateway device, the downlink data packet is sent to the terminal via the IAB node 1 or the IAB node 2. When service data is transmitted between the terminal and the DgNB, there are two optional paths: terminal-IAB node 1-DgNB, and terminal-IAB node 2-DgNB. When it is considered that the service data of the terminal is transmitted through a plurality of paths, in the example in FIG. 2, downlink service data of the terminal is split at the DgNB and aggregated at the terminal. Uplink service data of the terminal is split at the terminal and aggregated at the DgNB.

Figure 3:
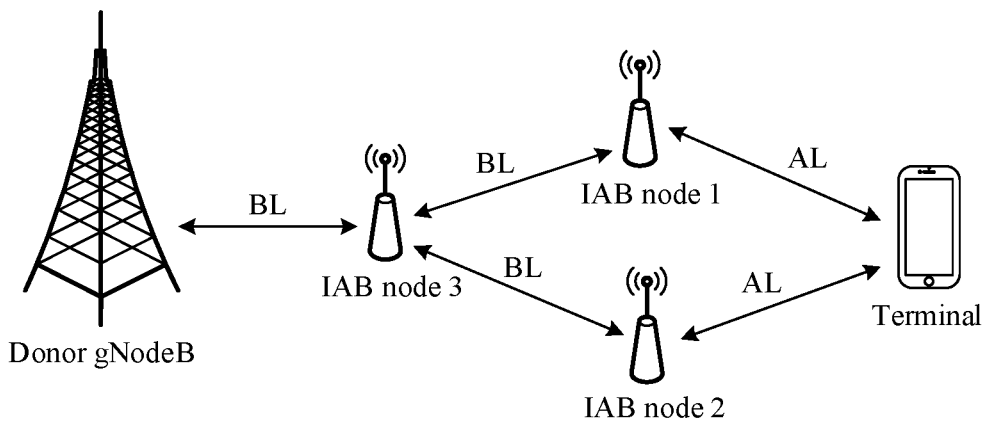

For example, referring to FIG. 3, a terminal has two ALs, which are respectively connected to an IAB node 1 and an IAB node 2. Parent nodes of the IAB node 1 and the IAB node 2 are both an IAB node 3, and a parent node of the IAB node 3 is a DgNB. When service data is transmitted between the terminal and the DgNB, there are two optional paths: terminal-IAB node 1-IAB node 3-DgNB, and terminal-IAB node 2-IAB node 3-DgNB. In the scenario shown in FIG. 3, when it is considered that the service data of the terminal is transmitted through the two paths, downlink service data of the terminal is split at the IAB node 3 and aggregated at the terminal. Uplink service data of the terminal is split at the terminal and aggregated at the IAB node 3.

Figure 4:
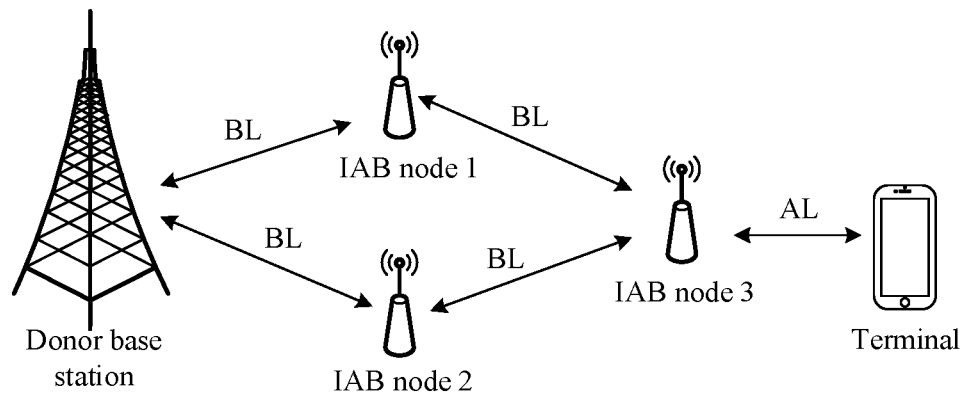

For example, referring to FIG. 4, there is only one AL between a terminal and an IAB node 3, and the IAB node 3 has two parent nodes: an IAB node 1 and an IAB node 2. To be specific, the IAB node 3 has two BLs, and parent nodes of the IAB node 2 and the IAB node 1 are both a DgNB. When service data is transmitted between the terminal and the DgNB, there are two optional paths: terminal-IAB node 3-IAB node 1-DgNB, and terminal-IAB node 3-IAB node 2-DgNB. When it is considered that the service data of the terminal is transmitted through the two paths, downlink service data of the terminal is split at the DgNB and aggregated at the IAB node 3. Uplink service data of the terminal is split at the IAB node 3 and aggregated at the DgNB.

For example, referring to FIG. 1, there is only one AL between a terminal and an IAB node 4, the IAB node 4 has a plurality of BLs, both an IAB node 2 and an IAB node 3 are parent nodes of the IAB node 4, parent nodes of the IAB node 3 and the IAB node 2 are both an IAB node 1, and a parent node of the IAB node 1 is a DgNB. When service data is transmitted between the terminal and the DgNB, there are two optional paths: terminal-IAB node 4-IAB node 3-IAB node 1-DgNB, and terminal-IAB node 4-IAB node 2-IAB node 1-DgNB. When it is considered that the service data of the terminal is transmitted through the two paths, downlink service data of the terminal is split at the IAB node 1 and aggregated at the IAB node 4, and uplink service data of the terminal is split at the IAB node 4 and aggregated at the IAB node 1.

Figure 5:
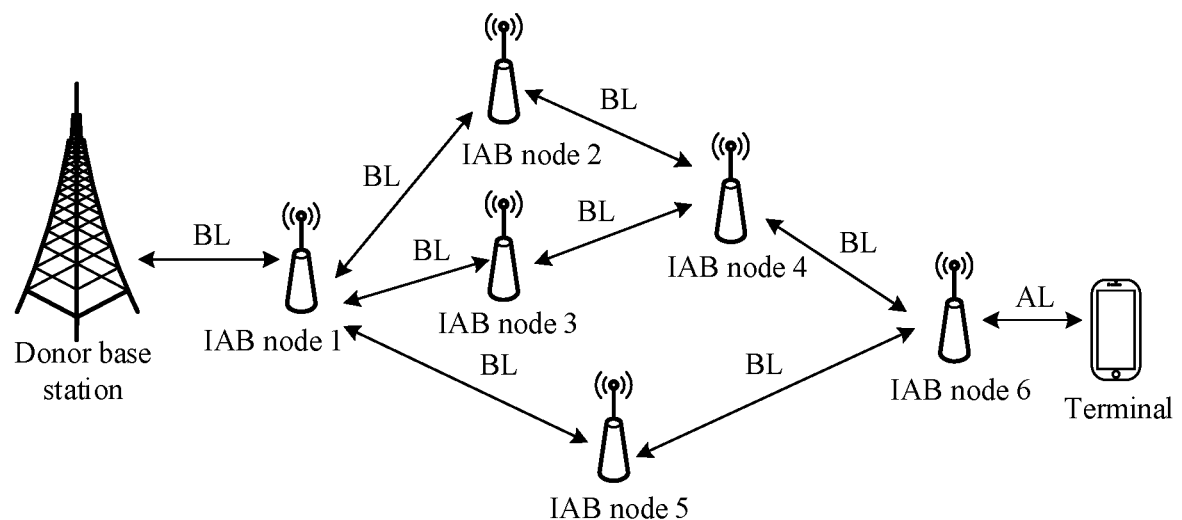

For example, referring to FIG. 5, there is only one AL between a terminal and an IAB node 6, the IAB node 6 has a plurality of BLs, parent nodes of the IAB node 6 are an IAB node 4 and an IAB node 5, parent nodes of the IAB node 4 are an IAB node 2 and an IAB node 3, parent nodes of the IAB node 2, the IAB node 3, and the IAB node 5 are all an IAB node 1, and there is one BL between the IAB node 1 and a DgNB. When service data is transmitted between the terminal and the DgNB, there are three optional paths: terminal-IAB node 6-IAB node 4-IAB node 3-IAB node 1-DgNB, terminal-IAB node 6-IAB node 4-IAB node 2-IAB node 1-DgNB, and terminal-IAB node 6-IAB node 5-IAB node 1-DgNB. When it is considered that the service data of the terminal is transmitted through the three paths, downlink service data of the terminal is split at the IAB node 1 and aggregated at the IAB node 6, and uplink service data of the terminal is split at the IAB node 6 and aggregated at the IAB node 1. Further, the downlink service data sent by the IAB node 1 to the terminal via the IAB node 2 and the IAB node 3 is aggregated at the IAB node 4, and the uplink service data of the terminal sent by the IAB node 4 via the IAB node 2 and the IAB node 3 is aggregated at the IAB node 1.

The foregoing IAB networking scenarios are merely examples, and both the DgNB and the IAB nodes are devices on a radio access network (RAN) side. In an IAB scenario in which multi-hop is combined with multi-connection, there are more other possibilities of IAB networking scenarios. For example, the DgNB and an IAB node served by another DgNB form a dual connection to serve a terminal. The possibilities are not listed one by one herein.

Network elements in this application include a terminal, an access network device (for example, a base station), and a wireless backhaul node (for example, an IAB node). It should be noted that the terminal in the embodiments of this application may also be referred to as user equipment (UE), an access terminal, a subscriber unit, a subscriber station, a mobile station, a remote station, a remote terminal, a mobile device, a user terminal, a wireless communications device, a user agent, or a user apparatus. The terminal may alternatively be a station (ST) in a wireless local area network (WLAN), a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, or a wearable device (which may also be referred to as a wearable intelligent device). The terminal may alternatively be a terminal in a next-generation communications system, for example, a terminal in 5G or a terminal in a future evolved public land mobile network (PLMN), or a terminal in a new radio (NR) communications system.

The IAB node may be a device such as customer premises equipment (CPE) or a residential gateway (RG). The method provided in the embodiments of this application may be further applied to a home access scenario.

In the prior art, duplication of a data packet and duplicate detection of a data packet are performed at a PDCP layer, and an execution body is a terminal or a base station. In an IAB network, a peer PDCP layer of a PDCP layer of a terminal is located on a node, namely, a DgNB or a specific IAB node (for example, an IAB node providing an access service for the UE). If duplication of a data packet and duplicate detection of a data packet of the terminal is to be performed in the IAB network in a manner in the prior art, the duplication and the duplicate detection can be performed only on the terminal and the DgNB or the specific IAB node. However, in some IAB scenarios in which multi-hop and multi-connection are used, there is a common link between a plurality of paths between a terminal and a base station (where for example, in FIG. 4, both paths between the terminal and the DgNB include a link between the terminal and the IAB node 3); and if carrier aggregation is not considered on these common links, there is no characteristic that a diversity gain is brought by transmitting same data packets through a plurality of paths. Therefore, transmission of same data packets over the common link has limited effects in improving data packet transmission reliability and reducing a delay, and results in wastes of some transmission resources.

Based on this problem, the embodiments of this application provide a data transmission method. A plurality of same data packets are transmitted between a terminal and a base station through a plurality of paths, the data packet is duplicated at a splitting node of data packets on the plurality of paths, and/or, duplicate detection is performed on the data packets at an aggregation node of data packets on the plurality of paths, to avoid wastes of transmission resources.

Figure 6:
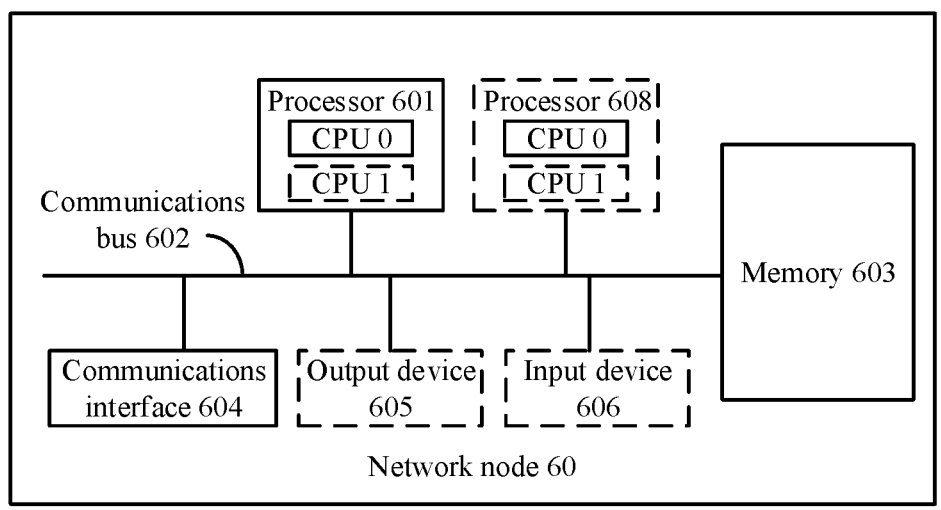
FIG. 6 is a schematic diagram of a hardware structure of a network node according to an embodiment of this application.

To save transmission resources, the embodiments of this application provide a network node, which may specifically include a first node and a second node in the following descriptions. For a schematic diagram of a hardware structure of a network node, refer to FIG. 6. FIG. 6 is a schematic diagram of a hardware structure of a network node 60. The network node 60 includes at least one processor 601, a communications bus 602, a memory 603, and at least one communications interface 604.

The processor 601 may be a general-purpose central processing unit (CPU), a microprocessor, an application-specific integrated circuit (ASIC), or one or more integrated circuits configured to control program execution in the solutions in this application.

The communications bus 602 may include a path for transmitting information between the foregoing components.

The communications interface 604 may be any apparatus such as a transceiver, and is configured to communicate with another device or communications network, such as the Ethernet, a RAN, or a WLAN.

The memory 603 may be a read-only memory (ROM) or another type of static storage device capable of storing static information and instructions, a random access memory (RAM) or another type of dynamic storage device capable of storing information and instructions, or may be an electrically erasable programmable read-only memory (EE-PROM), a compact disc read-only memory (CD-ROM) or another compact disc storage, an optical disc storage (including a compressed optical disc, a laser disc, an optical disc, a digital versatile disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor by using the bus. The memory may alternatively be integrated with the processor.

The memory 603 is configured to store application program code for executing the solutions in this application, and the processor 601 controls the execution. The processor 601 is configured to execute the application program code stored in the memory 603, to implement the method provided in the following embodiments of this application.

During specific implementation, in an embodiment, the processor 601 may include one or more CPUs, for example, a CPU 0 and a CPU 1 in FIG. 6.

During specific implementation, in an embodiment, the network node 60 may include a plurality of processors, for example, the processor 601 and a processor 608 in FIG. 6. Each of the processors may be a single-core processor (single-CPU), or may be a multi-core processor (multi-CPU). The processor herein may be one or more devices, circuits, and/or processing cores for processing data (for example, a computer program instruction).

During specific implementation, in an embodiment, the network node 60 may further include an output device 605 and an input device 606.

To better understand the method described below, some protocol layers mentioned below and accompanying drawings related to the protocol layers are all described herein.

A protocol layer on a device includes at least one of the following protocol layers: a service data adaptation protocol (SDAP) layer, a PDCP layer, a general packet radio service tunneling protocol (GTP) layer, a user datagram protocol (UDP) layer, an internet protocol (IP) layer, a radio link control (RLC) layer, a media access control (MAC) layer, a physical layer (PHY), an Adapt (adaptation) layer, a BL-L2 layer, a BL-L1 layer, an L2 layer (layer 2), and an L1 layer (layer 1). The L2 layer is a link layer. For example, the L2 layer may be a data link layer in an open communications interconnection (OSI) reference model. The L1 layer may be a physical layer. For example, the L1 layer may be a physical layer in the OSI reference model.

The BL-L2 represents a link layer of a wireless backhaul link, and includes at least one of the following protocol layers: an SDAP layer, a PDCP layer, an RLC layer, and a MAC layer. The BL-L1 indicates a physical layer, namely, a PHY layer, of the wireless backhaul link. Specific functions of these protocol layers depend on a specific standard (for example, LTE or NR) used for the wireless backhaul link, and may include some or all functions of all protocol layers defined in the specific standard. The wireless backhaul link is a link corresponding to a Un interface, and may be a backhaul link between IAB nodes or a backhaul link between an IAB node and a DgNB.

The Adapt layer represents an adaptation layer (which may be referred to as an Adapt layer, namely, a first protocol layer below). The Adapt layer has at least one of the following capabilities: adding routing information that can be identified by a wireless backhaul node to a data packet; selecting routing based on the routing information that can be identified by the wireless backhaul node; adding identification information that can be identified by the wireless backhaul node and that is related to a quality of service (QoS) requirement to the data packet; performing QoS mapping on a plurality of links including the wireless backhaul node for the data packet; adding data packet type indication information to the data packet; and sending flow control feedback information to a node having a flow control capability. It should be noted that a name of a protocol layer having these capabilities is not necessarily an Adapt layer or a first protocol layer. A person skilled in the art may understand that any protocol layer having these capabilities may be understood as the Adapt layer or the first protocol layer in the embodiments of this application.

The routing information that can be identified by the wireless backhaul node may be one or more of information such as an identifier of UE, an identifier of an IAB node accessed by the UE, an identifier of a DgNB, an identifier of a Donor-DU, an identifier of a Donor-CU, and an identifier of a transmission path.

The QoS mapping on the plurality of links may be: performing, on the backhaul link based on the identifier that is of a radio bearer of UE and that is carried in the data packet, mapping from the radio bearer of the UE to a radio bearer or logical channel on the Un interface.

The data packet type indication information may be used to indicate that content encapsulated at the Adapt layer includes any one of the following types: user plane data of the UE, a radio resource control (RRC) message of the UE, an RRC message of the IAB node, a control layer application message (for example, an F1 application protocol (F1AP) message) on an interface between the IAB node and the DgNB or a CU of the DgNB, a flow control feedback message generated by the IAB node, and the like. One node may send a first message to a peer F1AP layer of another node via an F1AP layer of the node. The first message includes context management information of a terminal served by the another node and/or an RRC message of the terminal. A message generated or sent by a node at the F1AP protocol layer may be referred to as an F1AP message.

The identification information related to the QoS requirement may be a QoS flow identifier (QFI) of the UE, an identifier of a radio bearer (DRB) or a signaling radio bearer (SRB) of the UE, a differentiated services code point (DSCP), and the like.

For example, the node having the flow control capability may be the DgNB, the Donor-DU, the Donor-CU, or a parent node of the IAB node, or an upstream node providing a backhaul service for the IAB node. Content of the flow control feedback information may include one or more of the following information: a cache status and load of the IAB node, a status (for example, a link blockage, link resume, or link quality information) of a link including the IAB node, a bandwidth and transmission delay of a link including the IAB node, a sequence number of a data packet lost at the IAB node, a sequence number of a data packet successfully sent by the IAB node to a terminal or a child node of a terminal.

The Adapt layer may be above all protocol layers included in the BL-L2. For example, if the BL-L2 includes an RLC layer and a MAC layer, the Adapt layer may be above the RLC layer. The Adapt layer may alternatively be between any two protocol layers included in the BL-L2. For example, if the BL-L2 includes an RLC layer and a MAC layer, the Adapt layer may be between the RLC layer and the MAC layer, that is, above the MAC layer and below the RLC layer. The Adapt layer may alternatively be between the BL-L2 and the BL-L1. A specific position of the Adapt layer is not limited in the embodiments of this application. In addition, in a possible case, a function of the Adapt layer may alternatively be implemented by extending a function or functions of any one or more layers included in the BL-L2, and an additional protocol layer is not required. In another possible case, a function of the Adapt layer may alternatively be implemented by extending a function or functions of any one or more protocol layers above the BL-L2, and an additional protocol layer is not required.

In the embodiments of this application, the DgNB may be a complete function entity, or may be in a form in which a CU is separated from a DU, in other words, include a centralized unit (e.g. Donor-CU) of the donor base station and a distributed unit (e.g. Donor-DU) of the donor base station. If the DgNB is in the form in which the CU is separated from the DU, the L2 is a corresponding link layer on an interface between the CU and the DU, and the L1 is a corresponding physical layer on the interface between the CU and the DU. In addition, if the DgNB is a complete function entity, the protocol stacks of the CU and the protocol stacks of the DU in FIG. 7 to FIG. 11 shown below may not exist, and the DgNB needs to reserve only a peer protocol stack of the IAB node and a peer protocol stack of the terminal.

The accompanying drawings related to the protocol layer and mentioned below include FIG. 7 to FIG. 11 (IAB n in the accompanying drawings represents an IAB node n). FIG. 7 to FIG. 11 are drawn by using an example in which a network architecture is the network architecture shown in FIG. 1, and are separately described below.

Figure 7:
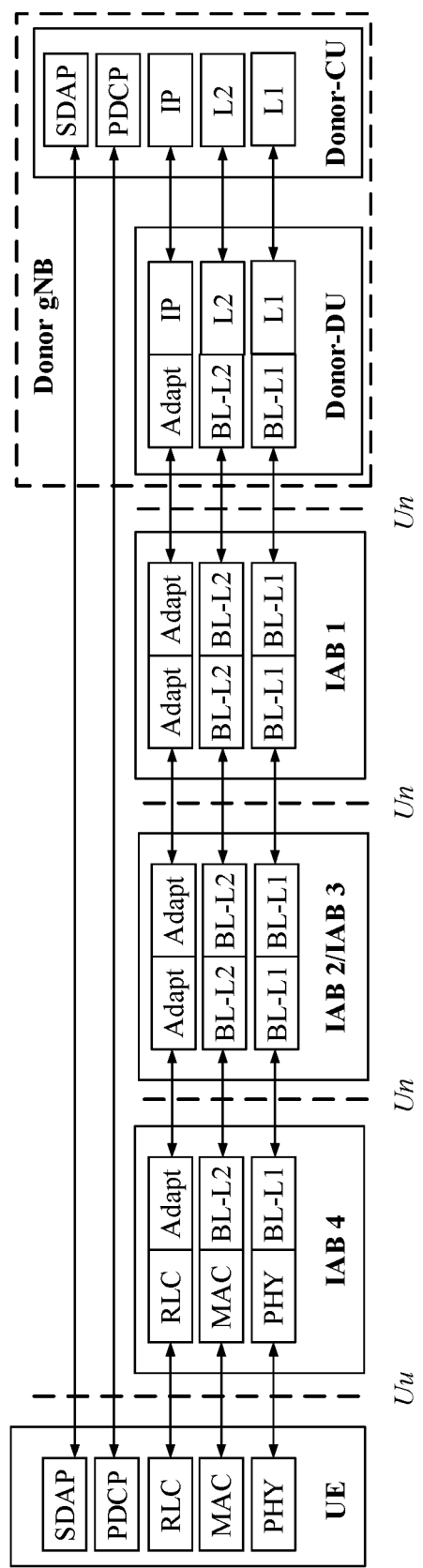
FIG. 7 to FIG. 11 are each a schematic architectural diagram of a protocol stack according to an embodiment of this application.

In FIG. 7, a user plane protocol architecture includes a CU, a DU, an IAB node 1, an IAB node 2, an IAB node 3, an IAB node 4, and UE. A protocol stack of the UE sequentially includes, from top to bottom, a peer SDAP layer and PDCP layer of the CU, and a peer RLC layer, MAC layer, and PHY layer of the IAB node 4. A protocol stack of the IAB node 4 for communication with the UE includes an RLC layer, a MAC layer, and a PHY layer from top to bottom, and a protocol stack of the IAB node 4 for communication with the IAB node 2/IAB node 3 sequentially includes an Adapt layer, a BL-L2 layer, and a BL-L1 layer from top to bottom. A protocol stack of the IAB node 2/IAB node 3 for communication with the IAB node 4 and a protocol stack of the IAB node 2/AB node 3 for communication with the IAB node 1 each sequentially include an Adapt layer, a BL-L2 layer, and a BL-L1 layer from top to bottom. A protocol stack of the IAB node 1 for communication with the IAB node 2/AB node 3 and a protocol stack of the IAB node 1 for communication with the DU each sequentially include an Adapt layer, a BL-L2 layer, and a BL-L1 layer from top to bottom. A protocol stack of the DU for communication with the IAB node 1 sequentially includes an Adapt layer, a BL-L2 layer, and a BL-L1 layer from top to bottom, and a protocol stack of the DU for communication with the CU sequentially includes an IP layer, an L2 layer, and an L1 layer from top to bottom. A protocol stack of the CU sequentially includes, from top to bottom, a peer SDAP layer and PDCP layer of the UE, and a peer IP layer, L2 layer, and L1 layer of the DU.

The embodiments of this application further provide another protocol stack architecture. To be specific, in FIG. 7, the protocol stack of the DU for communication with the CU further includes an Adapt layer and/or a GTP layer and UDP layer that are/is above the IP layer; correspondingly, the protocol stack of the CU further includes a peer Adapt layer and/or a peer GTP layer and UDP layer of the DU that are/is between the IP layer and the PDCP layer. Optionally, in the protocol stack architecture, the protocol stack of the DU for communication with the IAB node 1 in FIG. 7 may not include the Adapt layer; correspondingly, the protocol stack of the CU further includes a peer Adapt layer of the IAB node 1 below the PDCP layer.

Figure 8:
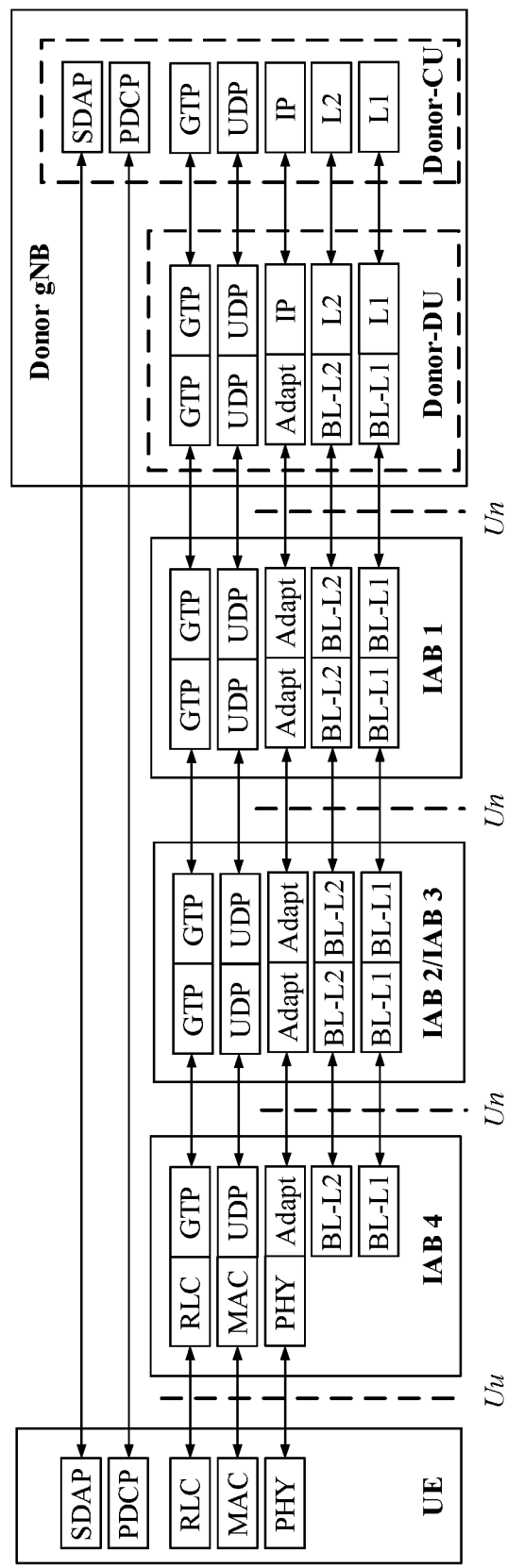

In FIG. 8, a user plane protocol architecture includes a CU, a DU, an IAB node 1, an IAB node 2, an IAB node 3, an IAB node 4, and UE. A protocol stack of the UE sequentially includes, from top to bottom, a peer SDAP layer and PDCP layer of the CU, and a peer RLC layer, MAC layer, and PHY layer of the IAB node 4. A protocol stack of the IAB node 4 for communication with the UE sequentially includes an RLC layer, a MAC layer, and a PHY layer from top to bottom, and a protocol stack of the IAB node 4 for communication with the IAB node 2/AB node 3 sequentially includes a GTP layer, a UDP layer, an Adapt layer, a BL-L2 layer, and a BL-L1 layer from top to bottom. A protocol stack of the IAB node 2/AB node 3 for communication with the IAB node 4 and a protocol stack of the IAB node 2/AB node 3 for communication with the IAB node 1 each sequentially include a GTP layer, a UDP layer, an Adapt layer, a BL-L2 layer, and a BL-L1 layer from top to bottom. A protocol stack of the IAB node 1 for communication with the IAB node 2/IAB node 3 and a protocol stack of the IAB node 1 for communication with the DU each sequentially include a GTP layer, a UDP layer, an Adapt layer, a BL-L2 layer, and a BL-L1 layer from top to bottom. A protocol stack of the DU for communication with the IAB node 1 sequentially includes a GTP layer, a UDP layer, an Adapt layer, a BL-L2 layer, and a BL-L1 layer from top to bottom, and a protocol stack of the DU for communication with the CU sequentially includes a GTP layer, a UDP layer, an IP layer, an L2 layer, and an L1 layer from top to bottom. A protocol stack of the CU sequentially includes, from top to bottom, a peer SDAP layer and PDCP layer of the UE, and a peer GTP layer, UDP layer, IP layer, L2 layer, and L1 layer of the DU.

In this case, a GTP tunnel may be established between the IAB node 4 and the IAB node 2/the IAB node 3, a GTP tunnel may be established between the IAB node 2/the IAB node 3 and the IAB node 1, a GTP tunnel may be established between the IAB node 1 and the DU, and a GTP tunnel may be established between the DU and the CU. In other words, a hop-by-hop GTP tunnel may be established between the IAB node 4 and the CU.

Compared with FIG. 7, in FIG. 8, data of UE may be transmitted through the hop-by-hop GTP tunnel. A peer adaptation layer on a Un interface may alternatively be replaced by an IP layer.

The embodiments of this application further provide another protocol stack architecture. To be specific, the GTP layer and the UDP layer on the IAB node 4 in FIG. 8 are direct peers of the GTP layer and the UDP layer on the DU, and the IAB node 1 and the IAB node 2/the IAB node 3 do not need to support the GTP layer and the UDP layer. In this case, a GTP tunnel may be established between the IAB node 4 and the DU, and a GTP tunnel may be established between the DU and the CU. The two GTP tunnels are in a one-to-one correspondence (or referred to as one-to-one mapping). Optionally, in the protocol stack architecture, a communication protocol layer on a Un interface in FIG. 8 may further include a peer IP layer between a UDP layer and an Adapt layer. Optionally, in the protocol stack architecture, the UDP layer on the IAB node 1 and the peer UDP layer of the UDP layer on the IAB node 1 that are on the Un interface in FIG. 8 may not exist.

Figure 9:
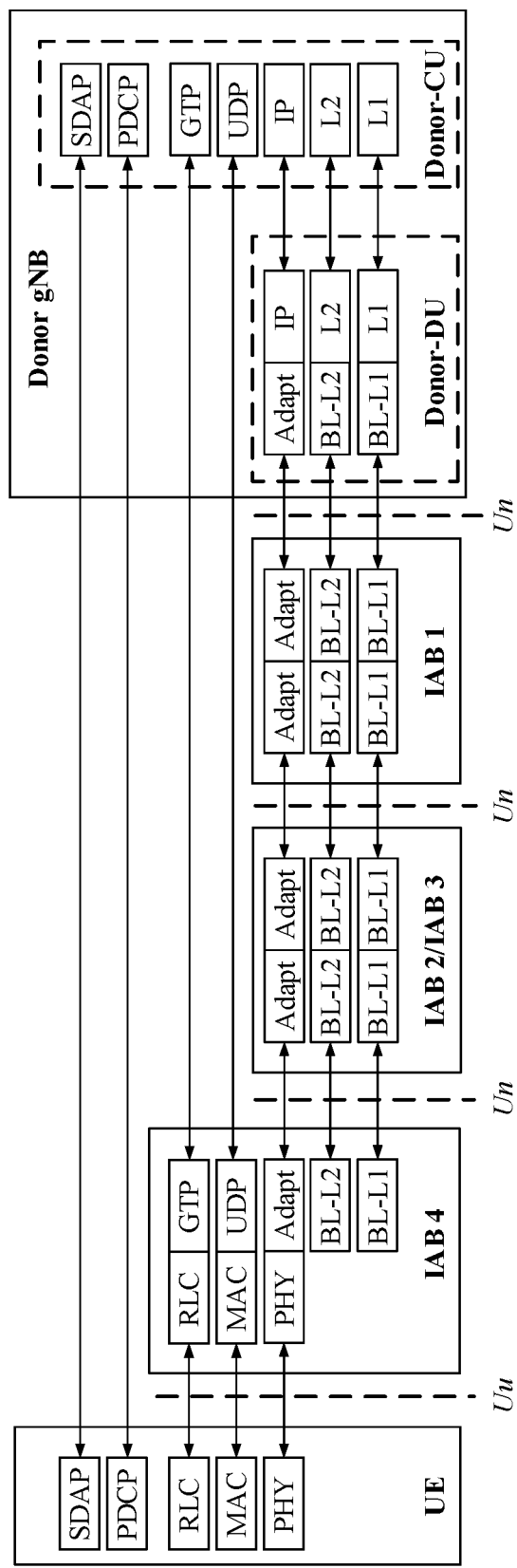

In FIG. 9, a user plane protocol architecture includes a CU, a DU, an IAB node 1, an IAB node 2, an IAB node 3, an IAB node 4, and UE. A protocol stack of the UE sequentially includes, from top to bottom, a peer SDAP layer and PDCP layer of the CU, and a peer RLC layer, MAC layer, and PHY layer of the IAB node 4. A protocol stack of the IAB node 4 for communication with the UE includes an RLC layer, a MAC layer, and a PHY layer from top to bottom, and a protocol stack of the IAB node 4 for communication with the IAB node 2/IAB node 3 sequentially includes, from top to bottom, a peer GTP layer and UDP layer of the CU, and a peer Adapt layer, BL-L2 layer, and BL-L1 layer of the IAB node 2/IAB node 3. A protocol stack of the IAB node 2/IAB node 3 for communication with the IAB node 4 and a protocol stack of the IAB node 2/IAB node 3 for communication with the IAB node 1 each sequentially include an Adapt layer, a BL-L2 layer, and a BL-L1 layer from top to bottom. A protocol stack of the IAB node 1 for communication with the IAB node 2/IAB node 3 and a protocol stack of the IAB node 1 for communication with the DU each sequentially include an Adapt layer, a BL-L2 layer, and a BL-L1 layer from top to bottom. A protocol stack of the DU for communication with the IAB node 1 sequentially includes an Adapt layer, a BL-L2 layer, and a BL-L1 layer from top to bottom, and a protocol stack of the DU for communication with the CU sequentially includes an IP layer, an L2 layer, and an L1 layer from top to bottom. A protocol stack of the CU sequentially includes, from top to bottom, a peer SDAP layer and PDCP layer of the UE, a peer GTP layer and UDP layer of the IAB node 4, and a peer IP layer, L2 layer, and L1 layer of the DU.

In this case, an end-to-end GTP tunnel may be established between the IAB node 4 and the CU. Optionally, the peer UDP layers of the IAB node 4 and the CU in FIG. 9 may not exist.

Figure 10:
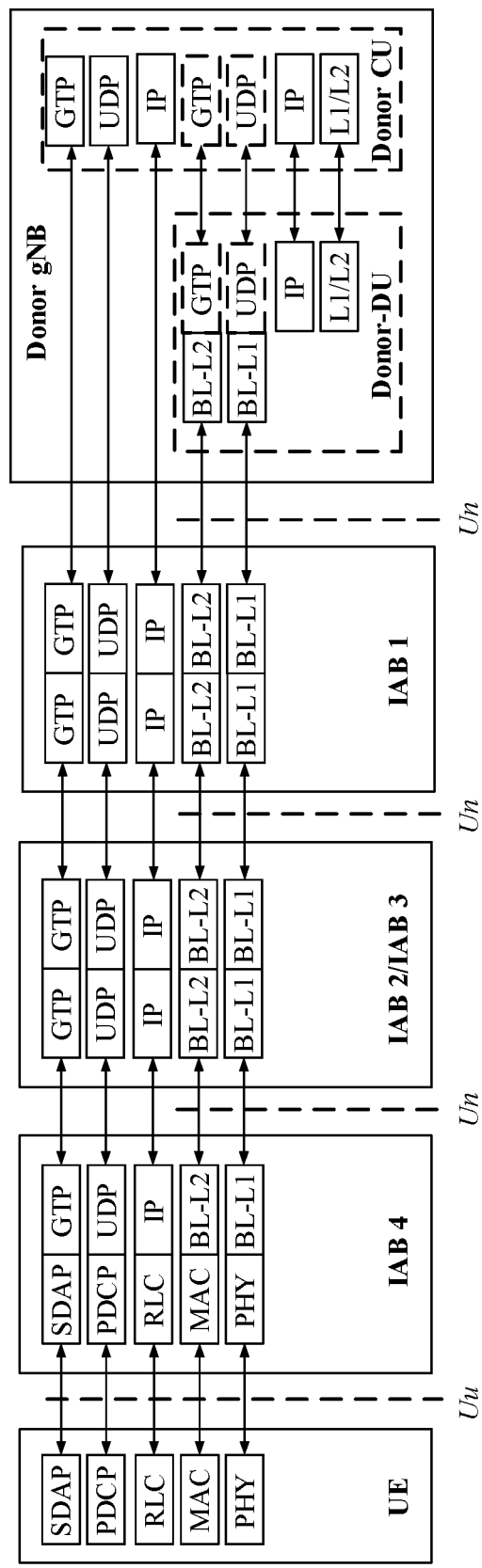

In FIG. 10, a user plane protocol architecture includes a CU, a DU, an IAB node 1, an IAB node 2, an IAB node 3, an IAB node 4, and UE. A protocol stack of the UE sequentially includes a peer SDAP layer, PDCP layer, RLC layer, MAC layer, and PHY layer of the IAB node 4 from top to bottom. A protocol stack of the IAB node 4 for communication with the UE sequentially includes an SDAP layer, a PDCP layer, an RLC layer, a MAC layer, and a PHY layer from top to bottom, and a protocol stack of the IAB node 4 for communication with the IAB node 2/IAB node 3 sequentially includes a GTP layer, a UDP layer, an IP layer, a BL-L2 layer, and a BL-L1 layer from top to bottom. A protocol stack of the IAB node 2/IAB node 3 for communication with the IAB node 4 and a protocol stack of the IAB node 2/IAB node 3 for communication with the IAB node 1 each sequentially include a GTP layer, a UDP layer, an IP layer, a BL-L2 layer, and a BL-L1 layer from top to bottom. A protocol stack of the IAB node 1 for communication with the IAB node 2/IAB node 3 sequentially include a GTP layer, a UDP layer, an IP layer, a BL-L2 layer, and a BL-L1 layer from top to bottom, and a protocol stack of the IAB node 1 for communication with the DU sequentially include, from top to bottom, a peer GTP layer, UDP layer, and IP layer of the CU, and a peer BL-L2 layer and BL-L1 layer of the DU. A protocol stack of the DU for communication with the IAB node 1 sequentially includes a BL-L2 layer and a BL-L1 layer from top to bottom, and a protocol stack of the DU for communication with the CU sequentially includes a GTP layer, a UDP layer, an IP layer, an L2 layer, and an L1 layer from top to bottom. A protocol stack of the CU sequentially includes, from top to bottom, a peer GTP layer, UDP layer, and IP layer of the IAB node 1, and a peer GTP layer, UDP layer, IP layer, L2 layer, and L1 layer of the DU.

In this case, a GTP tunnel may be established between the IAB node 4 and the IAB node 2/the IAB node 3, a GTP tunnel may be established between the IAB node 2, the IAB node 3, and the IAB node 1, and a GTP tunnel may be established between the IAB node 1 and the CU. If a DgNB is a complete function entity, in other words, a hop-by-hop GTP tunnel may be established between the IAB node 4 and the DgNB.

A next generation (NG) interface exists between the IAB node 4 and a core network, and the IAB node 4 is a termination point of the NG interface. The NG interface between the IAB node 4 and the core network is specifically implemented by establishing an NG interface between the IAB node 4 and the IAB node 2/IAB node 3, establishing an NG interface between the IAB node 2/IAB node 3 and the DU, and establishing an NG interface between the DU and the CU. That is, the NG interface between the IAB node 4 and the core network may be implemented by establishing a hop-by-hop NG interface. Data of the UE may be transmitted through a GTP tunnel of the hop-by-hop NG interface (or hop-by-hop NG interface proxy). The NG interface may alternatively be an S1 interface or another similar interface.

The IAB node 4 is an anchor of the PDCP layer of the UE. In other words, a peer PDCP layer of the PDCP layer of the UE is on the IAB node 4. A peer IP layer on a Un interface may alternatively be replaced by an adaptation layer.

The embodiments of this application further provide a protocol stack architecture. To be specific, the GTP layer and the UDP layer on the IAB node 4 in FIG. 10 are direct peers of the GTP layer and the UDP layer on the CU, and the IAB node 1 and the IAB node 2/the IAB node 3 do not need to support the GTP layer and the UDP layer. In this case, an end-to-end GTP tunnel may be established between the IAB node 4 and the CU, and the GTP tunnel may be in a one-to-one correspondence (or referred to as one-to-one mapping) with a GTP tunnel of an NG interface between the CU and a UPF serving the UE.

In addition, an Xn interface may further exist between an IAB node and the DgNB, or between an IAB node and another IAB node. The Xn interface may alternatively be an X2 interface or another similar interface.

Figure 11:
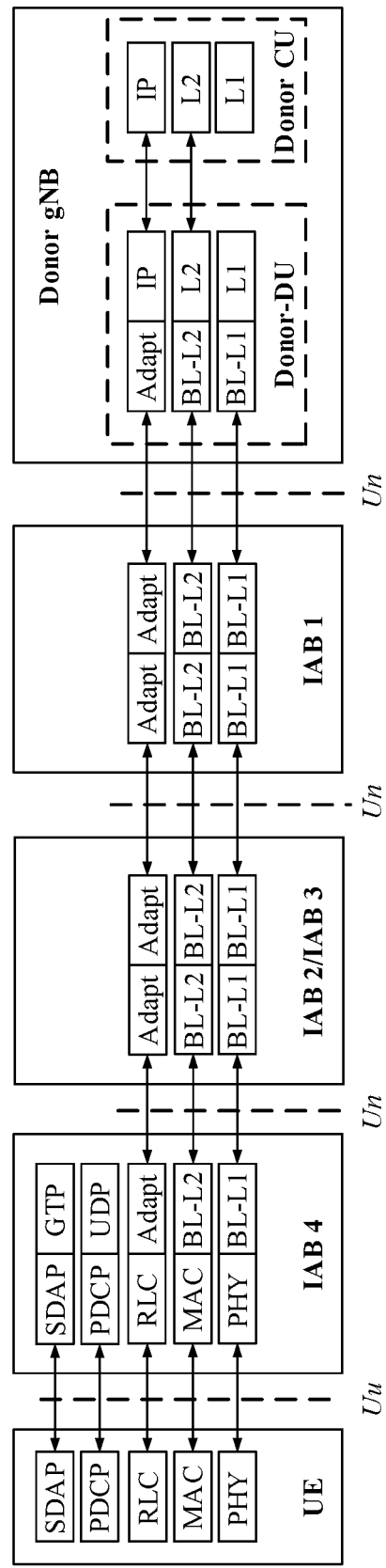

In FIG. 11, a user plane protocol architecture includes a CU, a DU, an IAB node 1, an IAB node 2, an IAB node 3, an IAB node 4, and UE. A protocol stack of the UE sequentially includes a peer SDAP layer, PDCP layer, RLC layer, MAC layer, and PHY layer of the IAB node 4 from top to bottom. A protocol stack of the IAB node 4 for communication with the UE sequentially includes an SDAP layer, a PDCP layer, an RLC layer, a MAC layer, and a PHY layer from top to bottom, and a protocol stack of the IAB node 4 for communication with the IAB node 2/IAB node 3 sequentially includes, from top to bottom, a peer GTP layer and UDP layer of a user plane gateway (for example, a UPF), and a peer Adapt layer, BL-L2 layer, and BL-L1 layer of the IAB node 2/IAB node 3. A protocol stack of the IAB node 2/IAB node 3 for communication with the IAB node 4 and a protocol stack of the IAB node 2/AB node 3 for communication with the IAB node 1 each sequentially include an Adapt layer, a BL-L2 layer, and a BL-L1 layer from top to bottom. A protocol stack of the IAB node 1 for communication with the IAB node 2/AB node 3 and a protocol stack of the IAB node 1 for communication with the DU each sequentially include an Adapt layer, a BL-L2 layer, and a BL-L1 layer from top to bottom. A protocol stack of the DU for communication with the IAB node 1 sequentially includes an Adapt layer, a BL-L2 layer, and a BL-L1 layer from top to bottom, and a protocol stack of the DU for communication with the CU sequentially includes an IP layer, an L2 layer, and an L1 layer from top to bottom. A protocol stack of the CU sequentially includes, from top to bottom, a peer IP layer, L2 layer, and L1 layer of the DU. Optionally, a peer Adapt layer on a Un interface may alternatively be replaced by an IP layer.

The IAB node (namely, the IAB 4) accessed by the UE provides a complete air interface protocol stack for the UE on a Uu interface. Service data of the UE is on the DgNB and other IAB nodes, and is routed and forwarded via the Adapt layers or the IP layers.

In this case, an end-to-end GTP tunnel may be established between the IAB node 4 and the user plane gateway (for example, the UPF serving the UE).

The embodiments of this application further provide another protocol stack architecture. To be specific, in FIG. 11, the protocol stack of the DU for communication with the CU further includes an Adapt layer and/or a GTP layer and UDP layer that are/is above the IP layer; correspondingly, the protocol stack of the CU further includes a peer Adapt layer and/or a peer GTP layer and UDP layer of the DU that are/is above the IP layer. Optionally, in the protocol stack architecture, the protocol stack of the DU for communication with the IAB node 1 in FIG. 11 may not include the Adapt layer; correspondingly, the protocol stack of the CU includes a peer Adapt layer of the IAB node 1.

The GTP layer in the embodiments of this application may be specifically a general packet radio service tunneling protocol-user plane (GTP-U) layer.

In the embodiments of this application, a position relationship between protocol layers is defined as follows: In a process of sending data by a node, a protocol layer that first processes a data packet is above a protocol layer that processes the data packet later, in other words, the protocol layer that processes the data packet first may be considered as an upper-layer protocol layer of the protocol layer that processes the data packet later; or in a process of receiving data by a node, a protocol layer that first processes a data packet is below a protocol layer that processes the data packet later, in other words, the protocol layer that first processes the data packet may be considered as a lower-layer protocol layer of the protocol layer that processes the data packet later. For example, referring to FIG. 7, in the protocol stack of the UE, both the SDAP layer and the PDCP layer are upper-layer protocol layers of the RLC layer, and the SDAP layer, the PDCP layer, and the RLC layer are all upper-layer protocol layers of the MAC layer.

To make the descriptions in the following clearer, descriptions of "hop-by-hop", "end-to-end", and "segment-by-segment" in the embodiments of this application are all clarified herein.

If a path between a node A and a node B includes S nodes, nodes on the path are successively: the node A, a node 1, a node 2, . . . , a node S, and the node B.

If the node A and the node B are described as each having a hop-by-hop peer protocol layer (which may be, for example, a first protocol layer), it indicates that the node A and the node 1 each have the peer protocol layer, a node s and a node s+1 each have the peer protocol layer, and the node S and the node B each have the peer protocol layer, where s is an integer greater than 0 and less than S.

If the node A and the node B are described as each having an end-to-end peer protocol layer, it indicates that the node A and the node B each have the peer protocol layer, the node A and the node 1 do not have the peer protocol layers, and the node S and the node B do not have the peer protocol layers either.

If the node A and the node B are described as each having a segment-by-segment peer protocol layer (which may be, for example, a first protocol layer), it indicates that the segment-by-segment peer protocol layers of the node A and the node B are established by using a plurality of the end-to-end peer protocol layers between the node A and the node B, and data may be transmitted between two endpoints of one of the plurality of the end-to-end peer protocol layers through forwarding by another node. For example, the segment-by-segment peer protocol layers of the node A and the node B may be established by using two end-to-end peer protocol layers between the node A and the node B. For example, the node A and a node S1 each have the end-to-end peer protocol layer, the node S1 and the node B each have the end-to-end peer protocol layer, and data may be transmitted between the node A and the node S1 or between the node S1 and the node B through forwarding by another node.

In the embodiments of this application, unless otherwise specified, that the node A and the node B each have a peer protocol layer may refer to the foregoing three cases.

If the node A and the node B are described as having a hop-by-hop peer tunnel (which may be, for example, a GTP tunnel) therebetween, it indicates that the node A and the node 1 have the peer tunnel therebetween, a node s and a node s+1 have the peer tunnel therebetween, and the node S and the node B have the peer tunnel therebetween, where s is an integer greater than 0 and less than S.

If the node A and the node B are described as having an end-to-end peer tunnel therebetween, it indicates that the node A and the node B have the peer tunnel therebetween, the node A and the node 1 do not have the peer tunnel therebetween, and the node S and the node B do not have the peer tunnel therebetween either.

If the node A and the node B are described as having a segment-by-segment peer tunnel therebetween, it indicates that the segment-by-segment peer tunnel between the node A and the node B is established by using a plurality of the end-to-end peer tunnels between the node A and the node B, and data may be transmitted between two endpoints of one of the plurality of the end-to-end peer tunnels through forwarding by another node. For example, the segment-by-segment peer tunnel between the node A and the node B may be established by using two end-to-end peer tunnels between the node A and the node B. For example, the node A and the node S1 have the end-to-end peer tunnel therebetween, the node S1 and the node B have the end-to-end peer tunnel therebetween, and data may be transmitted between the node A and the node S1 or between the node S1 and the node B through forwarding by another node.

In the embodiments of this application, unless otherwise specified, that the node A and the node B have a peer tunnel therebetween may refer to the foregoing three cases. It should be noted that, in the hop-by-hop (or segment-by-segment) peer tunnel described in the embodiments of this application, each hop (each segment) of the tunnel is in a one-to-one mapping.

The data packet in the embodiments of this application may be control plane signaling or user plane data. Alternatively, the data packet in the embodiments of this application may be a service data unit (SDU) or a PDU. The data packet in the embodiments of this application may be a downlink data packet, or may be an uplink data packet.

The following describes, with reference to FIG. 1 to FIG. 11, examples of the method provided in the embodiments of this application.

Figure 12:
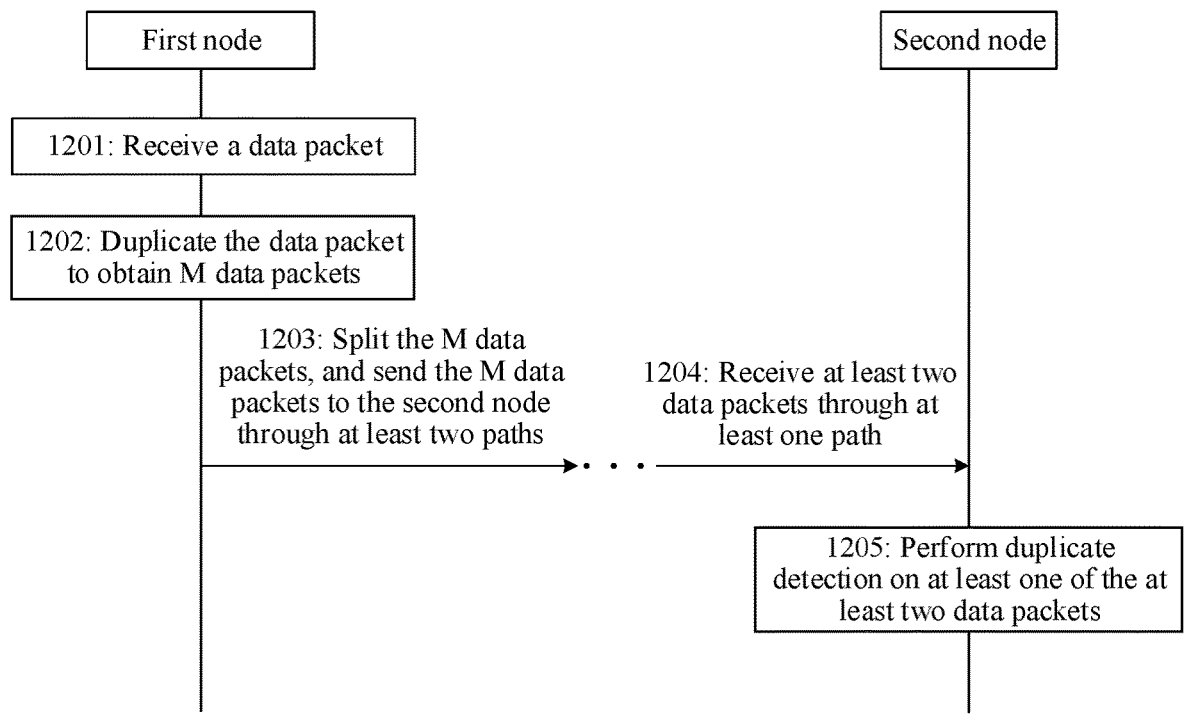
FIG. 12 is a flowchart of a data transmission method according to an embodiment of this application.

An embodiment of this application provides a data transmission method. As shown in FIG. 12, the method includes the following steps.

1201: A first node receives a data packet.

The first node may receive the data packet from a terminal or an access network device, or may receive the data packet from a wireless backhaul node. The access network device may be a DU, a CU, or a base station in which a DU and a CU are integrated. Whether the access network device in the following descriptions is specifically a DU, a CU, or a base station in which a DU and a CU are integrated may be determined based on a protocol stack in a specific application scenario.

1202: The first node duplicates the data packet to obtain M data packets, where M is an integer greater than 1.

Because the M data packets are obtained through duplication, it may be understood that the M data packets are same data packets.

1203: The first node splits the M data packets, and sends the M data packets to a second node through at least two paths.

The first node may send one data packet through one path, or may send a plurality of same data packets through one path. There may be a plurality of paths between the first node and the second node, and the paths (namely, the at least two paths) through which the M data packets are sent may be some or all of the paths between the first node and the second node. The first node may randomly select, from the paths between the first node and the second node, the paths for sending the M data packets, or may select, based on a preset condition and from the paths between the first node and the second node, the paths for sending the M data packets.

For example, referring to FIG. 5, if the first node is the IAB node 1, the second node is the IAB node 6, and there are three paths between the first node and the second node, the first node may send the M data packets through two of the three paths, or may send the M data packets through the three paths.

In addition, the path in this embodiment of this application may alternatively be a path for transmitting data on a carrier. In this case, the at least two paths in this embodiment of this application may alternatively be paths for transmitting data on at least two carriers.

1204: The second node receives at least two data packets through at least one path, where the at least one path is a path between the second node and the first node.

It should be noted that, although the first node sends the M data packets to the second node through the at least two paths, a packet may be lost in a process of transmitting the data packets through the paths. Therefore, the at least two data packets received by the second node may include a plurality of data packets in the M data packets, or may include only one of the M data packets.

1205: The second node performs duplicate detection on at least one of the at least two data packets.

During specific implementation of step 1205, the second node may perform duplicate detection on each of the at least two data packets. To be specific, the second node determines whether the data packet and another of the at least two received data packets or a cached data packet are duplicate data packets; and if the data packet and the another of the at least two received data packets or the cached data packet are duplicate data packets, may discard a duplicate data packet.

Optionally, at least two of the M data packets are aggregated at the second node. In this case, the second node receives the at least two of the M data packets. Optionally, after the duplicate detection is performed, the duplicate data packet in the at least two data packets may be discarded.

The first node is a wireless backhaul node. In this case, the second node is a terminal, an access network device, or another wireless backhaul node. Alternatively, the second node is a wireless backhaul node. In this case, the first node is a terminal, an access network device, or another wireless backhaul node. The wireless backhaul node is configured to provide a wireless backhaul service for a node that wirelessly accesses the wireless backhaul node. When the first node is a wireless backhaul node, the first node receives the data packet from an air interface. If the first node is an access network device, the first node receives the data packet from a wired interface (where for example, a DgNB or the CU receives the data packet through an NG interface between the DgNB or CU and a UPF, or the DU receives the data packet through an F1 interface between the DU and the CU) rather than receiving the data packet from an air interface.

For example, the wireless backhaul node may be a wireless backhaul node (for example, an IAB node) in a 5G network or a wireless backhaul node (for example, an RN) in an EPS network, or may be a wireless backhaul node in a future network system. This is not specifically limited in the embodiments of this application. In addition, it should be noted that the wireless backhaul node may alternatively be a terminal acting as a wireless backhaul node in a network.

For example, referring to FIG. 1, one of the first node and the second node may be the IAB node 1, and the other node may be the IAB node 4. Referring to FIG. 3, one of the first node and the second node may be the terminal, and the other node may be the IAB node 3. Referring to FIG. 4, one of the first node and the second node may be the DgNB, and the other node may be the IAB node 3. Referring to FIG. 5, in one case, one of the first node and the second node may be the IAB node 1, and the other node may be the IAB node 4; in another case, one of the first node and the second node may be the IAB node 1, and the other node may be the IAB node 6. In the cases shown in FIG. 5, a specific node performing duplication and duplicate detection on the data packet may be configured by a network, or may be determined through negotiation between nodes.

The M data packets are split at the first node (which may also be described as "the first node is a splitting node of the M data packets" or "the first node is a bifurcation point of the at least two paths for sending the M data packets"), and/or, the at least two of the M data packets are aggregated at the second node (which may also be described as "the second node is an aggregation node of the at least two of the M data packets" or "the second node is an aggregation point of the at least two paths for sending the M data packets").

According to the method provided in this embodiment of this application, the data packet is duplicated at the splitting node of the data packets, and/or duplicate detection is performed on the data packets at the aggregation node of the data packets. In the IAB scenario shown in FIG. 1, transmission of the duplicate data packet over a link between the terminal and the IAB node 4 and/or over a link between the DgNB and the IAB node 1 may be avoided. Compared with the prior art, in this method, resource utilization can be improved.

Optionally, a specific implementation of step 1202 may include: When determining that the data packet meets a preset condition, the first node duplicates the data packet to obtain the M data packets. In this case, the at least one data packet on which the second node performs duplicate detection may be a data packet that is in the at least two data packets received by the second node and that meets the preset condition.

That the data packet meets the preset condition includes at least one of the following cases: the data packet is a data packet of a specified terminal; the data packet is a data packet received from a specified wireless backhaul node, a data packet sent to a specified wireless backhaul node, or a data packet received from a specified wireless backhaul node and sent to a specified wireless backhaul node; the data packet is a data packet born on a specified radio bearer of a specified terminal; the data packet is a data packet born on a specified PDU session of a specified terminal; the data packet is a data packet in a specified QoS flow of a specified terminal; and the data packet is a data packet carrying first indication information. The first indication information is used to indicate that the data packet needs to meet one or more of the following cases: A packet loss rate of the data packet is less than or equal to a preset threshold; the data packet is a data packet of a specified service type; and the data packet is a data packet whose reliability requirement is greater than or equal to a second preset threshold. The second preset threshold is used to distinguish from the preset threshold. That a packet loss rate is less than or equal to a preset threshold may also be described as "a packet loss rate requirement is less than or equal to a preset threshold".

The preset condition herein may alternatively be considered as a granularity of data packet duplication. In this case, it may be learned, from the preset condition that the data packet meets, that the granularity of data packet duplication may be at least one of the following granularities: a UE granularity, an IAB node granularity, a radio bearer granularity, a PDU session granularity, a QoS flow granularity, and a data packet granularity.

In this case, the network may enable a duplication function for a specific data packet, to meet a QoS requirement of a service corresponding to the data packet. In this case, a QoS guarantee capability of the corresponding service or data packet can be ensured. For example, a QoS guarantee capability of data transmission of a service of the specified terminal can be improved; when any path between some specific nodes cannot meet a QoS requirement of a data packet needing to be transmitted, duplicate transmission may be performed through another path, so that a QoS guarantee capability of data transmission between these specific nodes can be improved; a QoS guarantee capability of data transmission of a specified service of the specified terminal can be improved; a QoS guarantee capability of transmission of a specified data packet can be improved.

The following separately describes different cases in which the data packet meets the preset condition.

Case (1): The data packet is a data packet of a specified terminal.

The specified terminal may be one or more terminals. In this case, the first node duplicates all data packets of the specified terminal. The first node may determine, based on an identifier of a terminal carried in a data packet, a terminal to which the data packet belongs.

For example, the specified terminal may be a user terminal having a high priority; or the specified terminal may be some preset terminals; or the specified terminal may be some terminals indicated by another device to the first node.

Case (2): The data packet is a data packet received from a specified wireless backhaul node, a data packet sent to a specified wireless backhaul node, or a data packet received from a specified wireless backhaul node and sent to a specified wireless backhaul node.

The specified wireless backhaul node may be one or more wireless backhaul nodes.

When the data packet is a data packet received from a specified wireless backhaul node, the first node duplicates all data packets received from the specified wireless backhaul node. When the data packet is a data packet sent to a specified wireless backhaul node, the first node duplicates all data packets sent to the specified wireless backhaul node. When the data packet is a data packet received from a specified wireless backhaul node and sent to a specified wireless backhaul node, the first node duplicates all data packets received from the specified wireless backhaul node and sent to the specified wireless backhaul node.

It should be noted that, when the data packet is a data packet received from a specified wireless backhaul node and sent to a specified wireless backhaul node, the two specified wireless backhaul nodes are different nodes.

The first node may determine, based on routing information carried in the data packet, whether the data packet is a data packet sent by the specified wireless backhaul node, and/or, the first node may determine, based on routing information carried in the data packet, whether the data packet is a data packet sent to the specified wireless backhaul node.

For example, referring to FIG. 1, if the first node is the IAB node 1, the second node is the IAB node 4. There are two paths between the IAB node 1 and the IAB node 4, and reliability guarantee of any one of the two paths is relatively poor. The IAB node 1 may duplicate all data packets that need to be sent to the IAB node 4, and then separately transmit data packets to the IAB node 4 through the two paths, to improve reliability of service data transmission. Specifically, the IAB node 1 may determine, based on routing information, data packets that need to be sent to the IAB node 4, and then duplicate the data packets. For example, when a destination address identifier carried in the data packet is an identifier of the IAB node 4 or an identifier of a child node of the IAB node 4, or a path identifier carried in the data packet indicates that the data packet is to be transmitted via the IAB node 4, the IAB node 1 determines that the data packet is a data packet that needs to be sent to the IAB node 4.

For example, the specified wireless backhaul nodes may be determined based on a current status of a path. For example, when a path for transmitting the data packet is blocked, the specified wireless backhaul nodes may be two endpoints of the path. If the two endpoints are respectively the IAB 1 and the IAB 4, the data packet is a data packet received from the IAB 1 (or the IAB 4) and sent to the IAB 4 (or the IAB 1).

Case (3): The data packet is a data packet born on a specified radio bearer of a specified terminal.

The specified terminal may be one or more terminals, and the specified radio bearer may also be one or more radio bearers (RB). The RB may be an SRB or a DRB.

In this case, the first node duplicates all data packets born on the specified radio bearer of the specified terminal. The first node may determine, based on an identifier of a terminal and an identifier of a radio bearer of a terminal that are carried in the data packet, whether the data packet is a data packet born on the specified radio bearer of the specified terminal. When a GTP tunnel between the first node and the second node corresponds to the radio bearer of the terminal, the first node may further determine, based on a tunnel endpoint identifier (TEID) of a GTP tunnel carried in the data packet (or determine, based on a TEID of a GTP tunnel and an identifier of the first node, such as an IP address, that are carried in the data packet), whether the data packet is a data packet born on the specified radio bearer of the specified terminal. Alternatively, the first node may determine, based on an identifier of a terminal and a TEID of a GTP tunnel, whether the data packet is a data packet born on the specified radio bearer of the specified terminal.

For example, the specified radio bearer may be a radio bearer corresponding to a service having a relatively high reliability requirement, or the specified radio bearer may be some preset radio bearers.

For example, if a DRB 1 of UE corresponds to a service having a relatively high reliability requirement, the specified terminal may be the UE, and the specified radio bearer may be the DRB 1. Referring to FIG. 1, if the first node is the IAB node 1, if a data packet received by the IAB node 1 from the DgNB carries an identifier of the UE and an identifier of the DRB 1, the first node duplicates the data packet.

Case (4): The data packet is a data packet born on a specified PDU session of a specified terminal.

In this case, a GTP tunnel between the first node and the second node may correspond to a PDU session of the terminal.

The specified terminal may be one or more terminals, and the specified PDU session may also be one or more PDU sessions. In this case, the first node duplicates all data packets born on the specified PDU session of the specified terminal. The first node may determine, based on a TEID of a GTP tunnel carried in the data packet (or determine, based on a TEID of a GTP tunnel and an identifier of the first node, such as an IP address, that are carried in the data packet), whether the data packet is a data packet born on the specified PDU session of the specified terminal. Alternatively, the first node may determine, based on an identifier of UE and a GTP of a GTP tunnel that are carried in the data packet, whether the data packet is a data packet born on the specified PDU session of the specified terminal. For example, the TEID may be included in a GTP layer protocol header of the data packet.

Case (5): The data packet is a data packet in a specified QoS flow of a specified terminal.

In this case, a GTP tunnel between the first node and the second node may correspond to a PDU session of the terminal, and a QFI of the QoS flow may be obtained by parsing header information of a GTP layer, or a QFI of the QoS flow may be obtained by parsing a first protocol layer.

The specified terminal may be one or more terminals, and the specified QoS flow may also be one or more QoS flows. In this case, the first node duplicates all data packets born in the specified QoS flow of the specified terminal. The first node may determine, based on an identifier of UE and a QFI that are carried in the data packet, whether the data packet is a data packet born in the specified QoS flow of the specified terminal. For example, the QFI may be included in a GTP layer protocol header of the data packet.

In the case (4) and the case (5), a specified wireless backhaul node may be determined based on a reliability requirement of a service, and reliability of the service may include a delay, a packet loss rate, jitter, and the like of the service. The first node may duplicate a data packet of a service having a relatively high reliability requirement. In this case, a service corresponding to the specified PDU session in the case (4) is a service having a relatively high reliability requirement, and a service corresponding to the specified QoS flow in the case (5) is a service having a relatively high reliability requirement.

Case (6): The data packet is a data packet carrying first indication information.

A: The first indication information is used to indicate that a packet loss rate of the data packet is less than or equal to the preset threshold.

In this case, once a data packet received by the first node carries the first indication information, the first node duplicates the data packet.

B: The data packet is a data packet of a specified service type.

The service of the specified service type may be a service having a relatively high reliability requirement, for example, may be an ultra-reliable low-latency communication (URLLC) service. In this case, the data packet may be a data packet of the URLLC service.

C. The data packet is a data packet whose reliability requirement is greater than or equal to the second preset threshold.

Reliability of the data packet may be understood as reliability of a service to which the data packet belongs. The second preset threshold may be preset or determined by a node according to a preset rule.

It should be noted that, that the data packet meets a preset condition may further include the foregoing cases (in other words, when the data packet meets conditions shown in the foregoing cases, the data packet meets the preset condition). For example, when the data packet meets the condition in any one of (1), (3), (4), and (5), the data packet further meets the condition in any one or more of (2) and (6).

Optionally, before step 1202, the method may further include: The first node receives configuration information, where the configuration information includes the preset condition, so that the first node determines, based on the preset condition, whether to duplicate the received data packet. It should be noted that the second node also needs to receive the configuration information, to determine, based on the preset condition, whether to perform duplicate detection on the received data packet.

The preset condition may be indicated by another node (for example, a DgNB and a core network element (for example, an access management function (AMF) unit and a session management function (SMF) unit) to the first node or the second node. For example, the another node may send, to the first node, context configuration information that is of the UE and includes a condition that needs to be met by the data packet in one or more of the cases (1), (3), (4), and (5). The context configuration information of the UE may further include an identifier of the UE, an RB identifier of the UE, and the like.

Specifically, in the case (1) to the case (6), information sent by the another node to the first node or the second node may be respectively as follows. In the case (1), the information may be an identifier of the specified terminal. In the case (2), the information may be an identifier of the specified wireless backhaul node. In the case (3), the information may be an identifier of the specified terminal+an identifier of the specified RB, a TEID of the GTP tunnel, or a TEID of the GTP tunnel+an identifier of the first/second node, for example, an IP address. In the case (4), the information may be an identifier of the specified terminal+an identifier of the specified PDU session, a TEID of the GTP tunnel, or a TEID of the GTP tunnel+an identifier of the first/second node, for example, an IP address. In the case (5), the information may be an identifier of the specified terminal+an identifier of the specified QoS flow. In the case (6), the information may be the first indication information. In addition, the information sent to the first node may further include information used to indicate the first node to duplicate the data packet based on the received information, and the information sent to the second node may further include information used to indicate the second node to perform duplicate detection on the data packet based on the received information. For example, the another node may send the information to the first node or the second node by using an RRC message or an F1AP message.

It should be noted that the preset condition may alternatively be determined by the first node and the second node through negotiation based on a network topology, a path/link status, a routing relationship, and the like.

Optionally, before step 1202, the method further includes: The first node receives second indication information, where the second indication information is used to indicate whether to activate a data duplication function of the first node; and when the second indication information is used to indicate to activate the data duplication function of the first node, the first node activates the data duplication function of the first node according to the second indication information. When the second indication information is used to indicate to deactivate the data duplication function of the first node, the first node deactivates the data duplication function of the first node according to the second indication information.

Further, the second indication information may indicate to activate or deactivate a data packet duplication function of a granularity. For example, a data packet duplication function of a PDU session granularity may be activated.

The second indication information may be included in radio resource control (RRC) signaling or an F1AP message sent by the DgNB. When there is a direct link between the first node and the DgNB, the DgNB may send the second indication information to the first node by using a MAC control element (CE). The DgNB may alternatively configure the second indication information for a wireless backhaul node by using an RRC message or an F1AP message, and the wireless backhaul node configures the second indication information for the first node by using a MAC CE. The DgNB may alternatively configure the second indication information for the first node by using an RRC message or an F1AP message.

Whether to activate the data packet duplication function may alternatively be determined by the first node and/or the second node based on the preset condition, or determined by the first node and the second node through negotiation based on the network topology, the path/link status, the routing relationship, and the like. In addition, the first node may alternatively activate the data duplication function when receiving the configuration information including the preset condition.

It should be noted that the network may also activate or deactivate the duplicate detection function of the second node. A specific method is similar to that for activating or deactivating the data duplication function of the first node, and details are not described herein again.

Optionally, the second indication information received by the second node may alternatively be forwarded by the first node to the second node after the first node receives the second indication information, or sent by the first node to the second node after the first node determines, based on the preset condition, whether to activate the data packet duplication function.

Optionally, the data packet includes a data packet identifier used by the second node to identify the data packet, and data packet identifiers of the M data packets are the same. In this case, a specific implementation of step 1205 may include: The second node performs duplicate detection on at least one of the at least two data packets based on the data packet identifier of the data packet.

For example, the data packet identifier may be a sequence number (SN) of the data packet, and same data packets have same sequence numbers. Therefore, if the second node receives two data packets having same sequence numbers, the two data packets are considered as duplicate data packets.

It should be noted that, if a data packet transmitted between the first node and the second node needs to be forwarded by another node, the another node does not modify or delete a data packet identifier of the data packet in a process of forwarding the data packet.

During specific implementation of the foregoing method, when protocol layers in nodes are different, duplication and duplicate detection on a data packet may be implemented in different manners. Details are described below.

Manner 1: The data packet is duplicated at a first protocol layer of the first node to obtain the M data packets.

In this case, step 1203 may specifically include: The first node splits the M data packets, and sends, at the first protocol layer of the first node, the M data packets to the second node via peer first protocol layers of the first node on the at least two paths.

For the second node, the at least one data packet is a data packet received by the second node at a first protocol layer of the second node via a peer first protocol layer of the second node. In this case, a specific implementation of step 1205 may include: The second node performs duplicate detection on at least one of the at least two data packets at the first protocol layer of the second node.

For content related to the first protocol layer herein and below, refer to the foregoing descriptions.

During implementation of this manner, the first node and the second node each have a hop-by-hop peer first protocol layer, an end-to-end peer first protocol layer, or a segment-by-segment peer first protocol layer. For example, this manner may be applied to the protocol stack architecture shown in any one of FIG. 7 to FIG. 9 and FIG. 11. For a wireless backhaul node, duplication and duplicate detection on a data packet may be performed at a first protocol layer.

The second node may perform duplicate detection on the data packet based on a PDCP SN, or may perform duplicate detection on the data packet based on a data packet identifier added by the first node to the data packet at the first protocol layer or an upper-layer protocol layer of the first protocol layer. In the protocol stacks shown in FIG. 7 to FIG. 9, the PDCP SN is added when a PDCP layer of an access network device (e.g. the DgNB or the Donor CU) processes the data packet. In the protocol stack architecture shown in any one of FIG. 7 to FIG. 9:

Specifically, in the protocol stack architecture shown in FIG. 7, the duplication and the duplicate detection on the data packet may be performed for a PDCP protocol data unit or a protocol data unit of the first protocol layer. Specifically, in the protocol stack architectures shown in FIG. 8 and FIG. 9, the duplication and the duplicate detection on the data packet may be performed for a UDP protocol data unit, an IP packet, or a protocol data unit of the first protocol layer.

Optionally, that the data packet meets the preset condition includes at least one of the following cases: the data packet is the data packet of the specified terminal; the data packet is the data packet received from the specified wireless backhaul node, the data packet sent to the specified wireless backhaul node, or the data packet received from the specified wireless backhaul node and sent to the specified wireless backhaul node; the data packet is the data packet born on the specified radio bearer of the specified terminal; the data packet is the data packet in the specified QoS flow of the specified terminal; and the data packet is the data packet carrying the first indication information.

In the protocol stack architecture shown in FIG. 11:

A data packet of the UE is mapped from a QoS flow to a DRB only on the IAB 4. Therefore, the DgNB and other wireless backhaul nodes do not know information about the DRB of the UE. Consequently, data duplication and duplicate detection at a DRB granularity of the UE cannot be performed. A specific reason is that in the prior art, mapping between the QoS flow of the UE and the DRB of the UE is performed at an SDAP layer. Therefore, only the UE and the IAB 4 know a mapping relationship between the QoS flow and the DRB, and the IAB 4 and another node do not need to learn of information about the DRB of the UE.

On the first node or the second node, a data packet obtained after the data packet is processed by an adaptation layer may carry information used for routing, for example, at least one of information such as an identifier of a transmission path, an identifier of the UE, an identifier of a wireless backhaul node that provides an access service for the UE, and an identifier of the DgNB/DU/CU. Optionally, the data packet processed by the adaptation layer may further carry label information used by the DgNB and a wireless backhaul node on a path between the first node and the second node to perform QoS mapping.

Specifically, in the protocol stack architecture shown in FIG. 11, the duplication and the duplicate detection on the data packet may be performed for a UDP protocol data unit or a protocol data unit of the first protocol layer.

Optionally, the data packet is a data packet of a terminal, a wireless backhaul node (namely, the IAB 4) accessed by the terminal and a UPF serving the terminal each have a peer GTP layer, and the terminal and the wireless backhaul node accessed by the terminal each have a peer SDAP layer and a peer PDCP layer; and that the data packet meets the preset condition includes at least one of the following cases: the data packet is the data packet of the specified terminal; the data packet is the data packet received from the specified wireless backhaul node, the data packet sent to the specified wireless backhaul node, or the data packet received from the specified wireless backhaul node and sent to the specified wireless backhaul node; and the data packet is the data packet carrying the first indication information.

The first node, the wireless backhaul node accessed by the terminal, and the second node are a plurality of nodes on a same path. For example, the wireless backhaul node accessed by the terminal may be the first node or the second node.

Manner 2: The data packet is duplicated at a GTP layer of the first node to obtain the M data packets, and the second node performs duplicate detection on at least one of the at least two data packets at a GTP layer of the second node.

In this case, step 1203 may specifically include: The first node splits the M data packets, and sends, at the GTP layer of the first node, the M data packets to the second node via peer GTP layers of the first node on the at least two paths.

For the second node, the at least one data packet is a data packet received by the second node at a GTP layer of the second node via a peer GTP layer of the second node. In this case, a specific implementation of step 1205 may include: The second node performs duplicate detection on at least one of the at least two data packets at the GTP layer of the second node.

When the first node is a wireless backhaul node, the second node is an access network device. When the second node is a wireless backhaul node, the first node is an access network device. The first node and the second node each have a hop-by-hop peer GTP layer, an end-to-end peer GTP layer, or a segment-by-segment peer GTP layer. For example, this manner may be applied to the protocol stack architecture shown in FIG. 8, FIG. 9, or FIG. 10.

When both the first node and the second node are wireless backhaul nodes, the first node and the second node each have a hop-by-hop peer GTP layer, an end-to-end peer GTP layer, or a segment-by-segment peer GTP layer. For example, this manner may be applied to the protocol stack architecture shown in FIG. 8 or FIG. 10.

In one case, the GTP tunnel between the first node and the second node one-to-one corresponds to the radio bearer of the terminal. The GTP tunnel between the first node and the second node may be a hop-by-hop GTP tunnel or an end-to-end GTP tunnel.

In this case, the GTP TEID allocated at the IAB node corresponds to the DRB of the UE. Therefore, the IAB node may identify the DRB of the UE based on the TEID carried in the data packet (or based on the TEID and an identifier of the IAB node). Referring to FIG. 1, downlink data transmission is used as an example. If the first node is the IAB node 1, when a data packet corresponding to the DRB 1 of the UE is to be duplicated, a downlink TEID allocated by the IAB node 1 to a GTP tunnel that is between the IAB node 1 and the DgNB and that corresponds to the DRB 1 of the UE is a TEID 1. If a downlink data packet received by the IAB node 1 includes the TEID 1, the IAB node 1 duplicates the data packet.

FIG. 1 is used as an example. It is assumed that one of the first node and the second node is the IAB 1, and the other node is an IAB 4.

In information that is maintained at the IAB 1 and about a tunnel between the IAB 1 and the IAB 2 and a tunnel between the IAB 1 and the IAB 1; and optionally, for a same DRB of same UE, there are two uplink TEIDs (where one TEID is allocated by the IAB 1 to the GTP tunnel between the IAB 1 and the IAB 2, and the other TEID is allocated by the IAB 1 to a GTP tunnel between the IAB 1 and the IAB 3; and optionally, the two uplink TEIDs may be the same) and two downlink TEIDs (one TEID is allocated by the IAB 2 to the GTP tunnel between the IAB 1 and the IAB 2, and the other TEID is allocated by the IAB 3 to the GTP tunnel between the IAB 1 and the IAB 3).

In information that is maintained at the IAB 4 and about a tunnel between the IAB 4 and the IAB 1 and a tunnel between the IAB 4 and the IAB 2, for a same DRB of same UE, there are two uplink TEIDs (where one TEID is allocated by the IAB 2 to the GTP tunnel between the IAB 4 and the IAB 2, and the other TEID is allocated by the IAB 3 to a GTP tunnel between the IAB 4 and the IAB 3) and two downlink TEIDs (one TEID is allocated by the IAB 4 to the GTP tunnel between the IAB 4 and the IAB 2, and the other TEID is allocated by the IAB 4 to the GTP tunnel between the IAB 4 and the IAB 3; and optionally, the two downlink TEIDs are the same).

In this case, that the data packet meets the preset condition includes at least one of the following cases: the data packet is the data packet of the specified terminal; the data packet is the data packet received from the specified wireless backhaul node, the data packet sent to the specified wireless backhaul node, or the data packet received from the specified wireless backhaul node and sent to the specified wireless backhaul node; the data packet is the data packet born on the specified radio bearer of the specified terminal; the data packet is the data packet in the specified QoS flow of the specified terminal; and the data packet is the data packet carrying the first indication information.

For a protocol stack architecture in this case, refer to FIG. 8. Specifically, in the protocol stack architecture shown in FIG. 8, the duplication and the duplicate detection on the data packet may be performed for a PDCP protocol data unit of a PDCP layer of the UE, a PDCP protocol data unit of a peer PDCP layer of a PDCP layer of the UE, or a protocol data unit of the GTP layer.

The second node may perform duplicate detection on the data packet based on a PDCP SN, or may perform duplicate detection on the data packet based on a data packet identifier added by the first node to the data packet at the GTP layer or an upper-layer protocol layer of the GTP layer. In the protocol stacks shown in FIG. 8 and FIG. 9, the PDCP SN is added when the PDCP layer of the UE or access network device (e.g. the DgNB or the Donor CU) processes the data packet.

In another case, the GTP tunnel between the first node and the second node one-to-one corresponds to the PDU session of the terminal. The GTP tunnel between the first node and the second node may be a hop-by-hop GTP tunnel or an end-to-end GTP tunnel.

In this case, that the data packet meets the preset condition includes at least one of the following cases: the data packet is the data packet of the specified terminal; the data packet is the data packet received from the specified wireless backhaul node, the data packet sent to the specified wireless backhaul node, or the data packet received from the specified wireless backhaul node and sent to the specified wireless backhaul node; the data packet is the data packet born on the specified PDU session of the specified terminal; the data packet is the data packet in the specified QoS flow of the specified terminal; and the data packet is the data packet carrying the first indication information.

For a protocol stack architecture in this case, refer to FIG. 10. Specifically, in the protocol stack architecture shown in FIG. 10, the duplication and the duplicate detection on the data packet may be performed for an IP data packet or a protocol data unit of the GTP Layer In this case, a header of the GTP layer of the data packet carries a TEID and a QFI. Therefore, the IAB node may identify the PDU session of the UE based on the TEID, and identify the QoS flow based on the QFI.

It should be noted that the first node and the second node need to maintain a mapping relationship between the TEID and the PDU session, and a correspondence between the QFI and the QoS flow.

In the protocol stack architecture shown in FIG. 10, activation and deactivation of the data duplication function may alternatively be determined by the DgNB and then notified to the first node and/or the second node by using an NG interface application protocol (NGAP) message.

The second node may perform duplicate detection on the data packet based on a data packet identifier added by the first node to the data packet at the GTP layer or an upper-layer protocol layer of the GTP layer.

Manner 3: The data packet is duplicated at a GTP layer (or a first protocol layer) of the first node to obtain the M data packets, and the second node performs duplicate detection on at least one of the at least two data packets at a PDCP layer of the second node.

The first node is a wireless backhaul node or an access network device, and the second node is a terminal (where in this case, an existing protocol stack of the terminal does not need to be changed in this manner). Specifically, the first node may duplicate an SDU of the GTP layer (or the first protocol layer).

In this case, step 1203 may specifically include: The first node splits the M data packets, and sends, at the GTP layer (or the first protocol layer) of the first node, the M data packets to the second node through the at least two paths.

For the second node, the at least one data packet is a data packet received by the second node at the PDCP layer of the second node. In this case, a specific implementation of step 1205 may include: The second node performs duplicate detection on at least one of the at least two data packets at the PDCP layer of the second node.

Optionally, that the data packet meets the preset condition includes: the data packet is the data packet born on the specified radio bearer of the specified terminal.

In this case, the duplication and the duplicate detection on the data packet may be performed for an SDU of a PDCP protocol data unit/GTP layer (or the first protocol layer). Duplicate detection may be performed on the data packet based on a PDCP SN, but cannot be performed based on a data packet identifier (for example, a sequence number) added by the first protocol layer or GTP layer to the data packet (to avoid that the UE cannot identify the data packet).

Manner 4: The data packet is duplicated at a GTP layer of the first node to obtain the M data packets, and the second node performs duplicate detection on at least one of the at least two data packets at an SDAP layer of the second node or an upper-layer protocol layer of SDAP.

In this case, the second node is UE, and the first node is an access network device or a wireless backhaul node.

The duplication and the duplicate detection on the data packet may be performed for an IP packet or a data packet of another type. A type of the data packet may be determined based on a type of a PDU session of the UE. For example, when the type of the PDU session of the UE is an Ethernet type, the type of the data packet may be an Ethernet type. The upper-layer protocol layer of SDAP may be, for example, an IP layer or an Ethernet protocol layer, or may be a newly added protocol layer.

For example, the duplication and the duplicate detection on the data packet may be performed for an IP packet. For the scenarios shown in FIG. 2 and FIG. 3, a splitting point of downlink service data is an IAB node or the DgNB. The IAB node or the DgNB duplicates the IP packet at a GTP layer, and adds a data packet identifier to outside of the IP packet (or an SDU of the GTP layer). As an aggregation point of the downlink service data, the UE needs to perform duplicate detection on at least one of the at least two data packets at the SDAP layer or the upper-layer protocol layer of SDAP.

Optionally, that the data packet meets the preset condition includes at least one of the following cases: the data packet is the data packet of the specified terminal; the data packet is the data packet received from the specified wireless backhaul node, the data packet sent to the specified wireless backhaul node, or the data packet received from the specified wireless backhaul node and sent to the specified wireless backhaul node; the data packet is the data packet born on the specified PDU session of the specified terminal; the data packet is the data packet in the specified QoS flow of the specified terminal; and the data packet is the data packet carrying the first indication information.

This manner may be applied to the protocol stack architecture shown in FIG. 10.

Manner 5: The data packet a data packet of the terminal, and is duplicated at a PDCP layer of the first node to obtain the M data packets. This manner may be applied to the protocol stack architecture shown in any one of FIG. 7 to FIG. 9:

The second node is a wireless backhaul node or an access network device, and the first node is a terminal (where in this case, an existing protocol stack of the terminal does not need to be changed in this manner).

In this case, step 1203 may specifically include: The first node splits the M data packets, and sends, at the PDCP layer of the first node, the M data packets to the second node through the at least two paths.

For the second node, the at least one data packet is a data packet received by the second node at a GTP layer (or a first protocol layer) of the second node. In this case, a specific implementation of step 1205 may include: The second node performs duplicate detection on at least one of the at least two data packets at the GTP layer (or the first protocol layer) of the second node.

Optionally, that the data packet meets the preset condition includes: the data packet is the data packet born on the specified radio bearer of the specified terminal.

In this case, the duplication and the duplicate detection on the data packet may be performed for an SDU of a PDCP protocol data unit/GTP layer (or the first protocol layer). Duplicate detection may be performed on the data packet based on a PDCP SN, but cannot be performed based on a data packet identifier (for example, a sequence number) added by the first protocol layer or GTP layer to the data packet.

Manner 6: The data packet is duplicated at an SDAP layer of the first node or an upper-layer protocol layer of SDAP to obtain the M data packets.

In this case, the first node is UE, and the second node is an access network device or a wireless backhaul node. The duplication and the duplicate detection on the data packet may be performed for an IP packet or a data packet of another type. A type of the data packet may be determined based on a type of a PDU session of the UE. For example, when the type of the PDU session of the UE is an Ethernet type, the type of the data packet may be an Ethernet type. The upper-layer protocol layer of SDAP may be, for example, an IP layer or an Ethernet protocol layer, or may be a newly added protocol layer.

For example, the duplication and the duplicate detection on the data packet are performed for an IP packet. If in the scenarios shown in FIG. 2 and FIG. 3, as a splitting point of uplink service data, the UE needs to duplicate the IP packet at the SDAP layer or a newly added protocol layer, adds a data packet identifier to outside of the IP packet, and then sends a plurality of data packets obtained after the duplication to the IAB node or the DgNB through a plurality of paths. As an aggregation point of the uplink service data, the IAB node or the DgNB needs to perform, based on the data packet identifier added by the UE to the outside of the IP packet, duplicate detection on the data packet at a protocol layer below an IP layer, for example, a GTP layer or a newly added protocol layer.

Optionally, that the data packet meets the preset condition includes at least one of the following cases: the data packet is the data packet of the specified terminal; the data packet is the data packet received from the specified wireless backhaul node, the data packet sent to the specified wireless backhaul node, or the data packet received from the specified wireless backhaul node and sent to the specified wireless backhaul node; the data packet is the data packet born on the specified PDU session of the specified terminal; the data packet is the data packet in the specified QoS flow of the specified terminal; and the data packet is the data packet carrying the first indication information.

This manner may be applied to the protocol stack architecture shown in FIG. 10.

Figure 13:
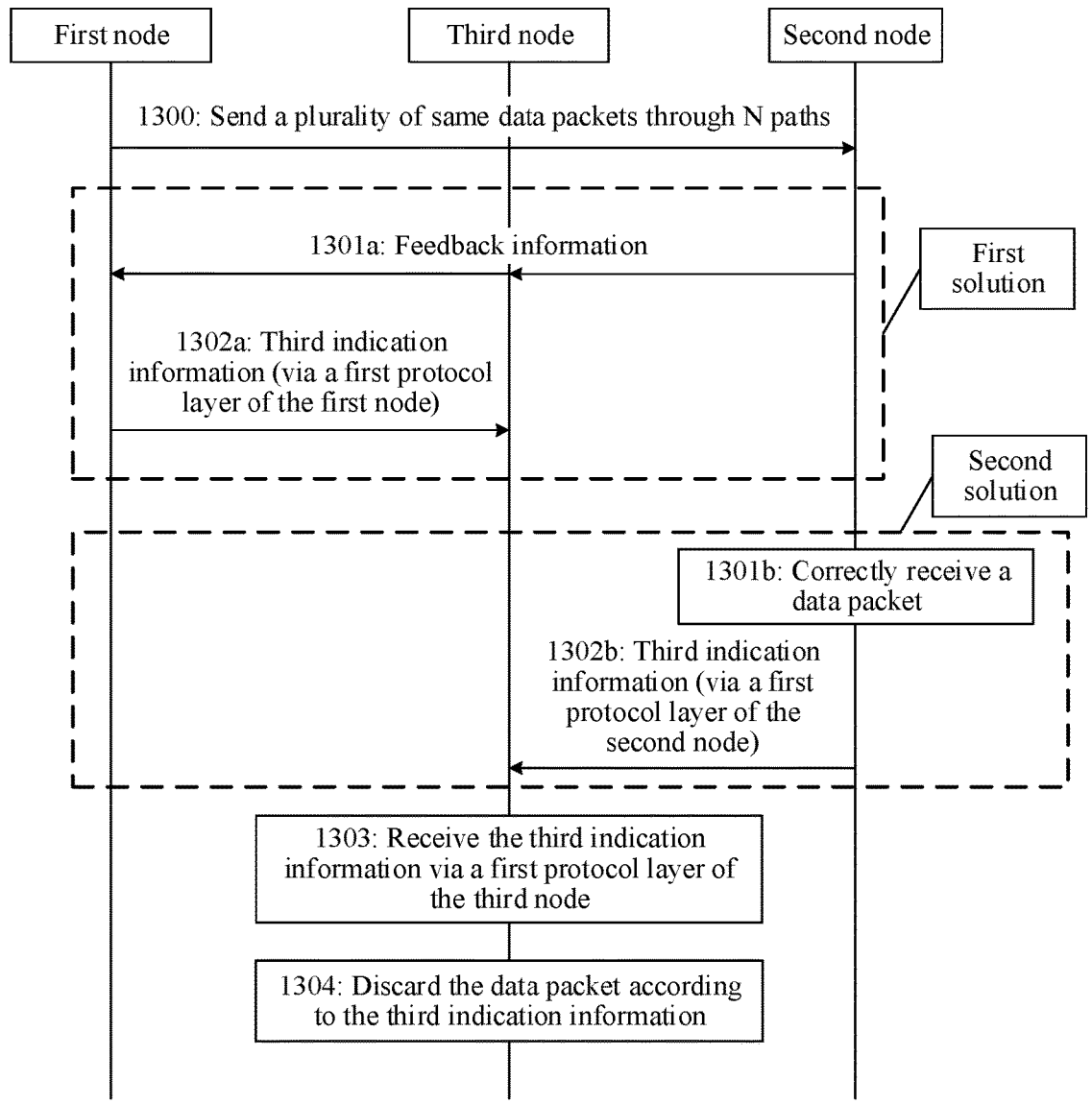
FIG. 13 is a flowchart of a data packet processing method according to an embodiment of this application.

An embodiment of this application further provides a data packet processing method. As shown in FIG. 13, FIG. 13 includes two solutions. A first solution includes steps 1300, 1301a, 1302a, 1303, and 1304, and a second solution includes steps 1301b, 1302b, 1303, and 1304. Optionally, the second solution may further include step 1300. One solution is a data packet processing method. A difference between the first solution and the second solution lies in that in the first solution, a first node sends third indication information, and in the second solution, a second node sends third indication information. Details are as follows.

1300: The first node sends a plurality of same data packets to the second node through N paths between the first node and the second node.

1301a: The first node receives feedback information from the second node. The feedback information is used to indicate that the second node correctly receives a data packet, and the data packet is a data packet in the plurality of same data packets sent by the first node to the second node. The plurality of same data packets are transmitted through the N paths between the first node and the second node.

For example, the feedback information may include a data packet identifier of the data packet received by the second node, for example, an SN of the data packet. The feedback information sent by the second node may be forwarded to the first node via one or more nodes on the N paths.

The plurality of same data packets may be a plurality of data packets obtained after the first node duplicates a data packet. It may be understood that the data packet identifier of the data packet included in the feedback information may be a data packet identifier allocated to the data packet by a protocol layer duplicating the data packet.

1302a: The first node sends, via a first protocol layer of the first node, third indication information to at least one node that is on the N paths and on which the first protocol layer is deployed. The third indication information is used to indicate to discard the data packet.

Optionally, the feedback information is specifically used to indicate that the second node correctly receives the data packet sent by the first node through N1 paths, where the N1 paths are paths in the N paths, and N1 is an integer greater than 0 and less than N. During specific implementation, step 1302a may include the following step:

The first node sends, via the first protocol layer of the first node, the third indication information to a node that is on N2 paths and on which the first protocol layer is deployed or the node that is on the N paths and on which the first protocol layer is deployed, where the N2 paths are paths that are in the N paths and other than the N1 paths.

In this optional method, because a node on the N1 paths has sent the data packet to the second node, the first node may send, via the first protocol layer of the first node, the third indication information to only the node that is on the N2 paths and on which the first protocol layer is deployed. This improves execution efficiency of the method. When the first node sends, via the first protocol layer of the first node, the third indication information to the node that is on the N2 paths and on which the first protocol layer is deployed, compared with the manner in which the first node sends, via the first protocol layer of the first node, the third indication information to the node that is on the N paths and on which the first protocol layer is deployed, signaling overheads are lower.

Steps 1303 and 1304 may be performed after step 1302a. A third node in steps 1303 and 1304 is any node in the at least one node.

1301b. The second node correctly receives a data packet from the first node. The data packet is a data packet in the plurality of same data packets sent by the first node to the second node. The plurality of same data packets are transmitted through the N paths between the first node and the second node.

1302b: The second node sends, via a first protocol layer of the second node, third indication information to at least one node that is on the N paths and on which the first protocol layer is deployed. The third indication information is used to indicate to discard the data packet.

The plurality of same data packets may be a plurality of data packets obtained after the first node duplicates a data packet.

In the second solution, to enable the second node to determine that the data packet received from the first node is a data packet in the plurality of same data packets, optionally, after activating a data duplication function, the first node may send, to the second node, information used to indicate that the first node has activated the data duplication function. Alternatively, only a data packet in the plurality of same data packets carries a data packet identifier. In this case, when the data packet received by the second node carries the data packet identifier, the second node may determine that the data packet is a data packet in the plurality of same data packets.

To enable the second node to determine a destination node of the third indication information, optionally, the second node is configured with information about the at least one node on which the first protocol layer is deployed; or the second node may further be configured with information, such as information about the N paths, a network topology, and routing information.

The second node may be configured with information about one or more of the N paths (for example, a path identifier), and a node on the one or more paths is also configured with the information about the one or more paths. Alternatively, the second node may be configured with information about a node on one or more of the N paths (for example, a node identifier, which may be specifically an address of the node).

If the second node is configured with only the information about the one or more paths, the second node may use the third indication information to carry the path identifier, and broadcast the third indication information. After receiving the third indication information broadcast by the second node, a node on the N paths determines, based on the information about the one or more paths configured for the node, whether to process the third indication information. For example, if a node receives the third indication information broadcast by the second node, and the node determines that the path identifier carried in the third indication information is the same as a path identifier configured for the node, the node processes the third indication information; or if the path identifier carried in the third indication information is different from a path identifier configured for the node, the node continues to broadcast the third indication information, where content of the indication information broadcast by the node is the same as content of received indication information. If the second node is configured with the information about the node on one or more of the N paths, the second node may send the third indication information to the configured node.

Optionally, the second node correctly receives the data packet sent by the first node through N1 paths, where the N1 paths are paths in the N paths, and N1 is an integer greater than 0 and less than N. During specific implementation, step 1302b may include the following step:

The second node sends, via the first protocol layer of the second node, the third indication information to a node that is on N2 paths and on which the first protocol layer is deployed or the node that is on the N paths and on which the first protocol layer is deployed, where the N2 paths are paths that are in the N paths and other than the N1 paths.

In this optional method, because a node on the N1 paths has sent the data packet to the second node, the second node may send, via the first protocol layer of the second node, the third indication information to only the node that is on the N2 paths and on which the first protocol layer is deployed. This improves execution efficiency of the method. When the second node sends, via the first protocol layer of the second node, the third indication information to the node that is on the N2 paths and on which the first protocol layer is deployed, compared with the manner in which the second node sends, via the first protocol layer of the second node, the third indication information to the node that is on the N paths and on which the first protocol layer is deployed, signaling overheads are lower.

Steps 1303 and 1304 may be performed after step 1302b. A third node in steps 1303 and 1304 is any node in the at least one node.

In this embodiment, one of the first node and the second node is a wireless backhaul node, and the other node is an access network device. Alternatively, both the first node and the second node are wireless backhaul nodes. For related descriptions of the wireless backhaul node and the access network device, refer to the foregoing descriptions. Details are not described herein again.

The plurality of same data packets may be a plurality of data packets obtained after the first node duplicates a data packet.

The N paths may be all or some paths between the first node and the second node. The first node may randomly select, from the paths between the first node and the second node, the N paths for sending the plurality of same data packets, or may select, based on a preset condition and from the paths between the first node and the second node, the N paths for sending the plurality of data packets. The first node may send one data packet through one path, or may send a plurality of same data packets through one path.

The at least one node may be a node that communicates with the first node via another node. In this case, the third indication information sent by the first node may be forwarded to the at least one node via the another node. Certainly, the first node may alternatively be a node that directly communicates with the first node. The first node and the at least one node each have a hop-by-hop peer first protocol layer, an end-to-end peer first protocol layer, or a segment-by-segment peer first protocol layer.

In this embodiment, for explanations of content related to the first protocol layer, refer to the foregoing descriptions. Details are not described herein again. The third indication information may be included in an existing message for sending, or may be included in a new message for sending, or the third indication information may be a message. The third indication information indicates to perform a discard operation, and further indicates a data packet corresponding to the discard operation.

1303: The third node receives the third indication information via a first protocol layer of the third node. The third indication information is used to indicate to discard the data packet.

Specifically, when step 1302a is performed before step 1303, during specific implementation of step 1303, the third node receives the third indication information from the first protocol layer of the first node via the first protocol layer of the third node. When step 1302b is performed before step 1303, during specific implementation of step 1303, the third node receives the third indication information from the first protocol layer of the second node via the first protocol layer of the third node.

1304: The third node discards the data packet according to the third indication information.

According to the method provided in this embodiment of this application, after the second node receives the data packet, the first node sends the third indication information to the at least one node on the N paths, and the at least one node may discard a duplicate data packet according to the third indication information, so that the at least one node may not need to send, to the second node, the data packet that has been received by the second node, to save transmission resources. In addition, the third indication information is transmitted via the first protocol layer, and an existing protocol stack of the terminal does not need to be changed, so that the existing terminal is compatible.

During specific implementation of steps 1302a and 1302b, the first node or the second node may send the third indication information to a plurality of nodes in the following two manners.

Manner (1): Point-to-Point Sending

After generating the third indication information, the first node or the second node sets a destination address of a message carrying the third indication information to an address of the at least one node. When a node receiving the message determines that the destination address of the message is an address of the node, the node performs a subsequent operation according to the message; or if the destination address of the message is not an address of the node, the node forwards the message.

Manner (2): Multicast Sending

The at least one node may be configured with one multicast address. Specifically, some or all nodes on a same path may be configured with one multicast address, and some or all nodes on a plurality of paths may also be configured with one multicast address. After generating the indication information, the first node or the second node sets a destination address of a message carrying the indication information to the multicast address. A node receiving the message determines whether the destination address of the message matches the multicast address configured for the node. If the destination address of the message matches the multicast address configured for the node, the node performs a subsequent operation according to the message and forwards the message; if the destination address of the message does not match the multicast address configured for the node, the node forwards the message, and still sets the destination address of the message to the multicast address. It may be understood that the path identifier is a special case of the multicast address.

Optionally, the third indication information is a message, a message type of the message indicates to perform a discard operation, and the message includes a data packet identifier of a data packet corresponding to the discard operation.

In this case, a specific implementation of step 1304 may include the following steps:

1304-1: The third node determines, based on the message type of the message, to perform the discard operation.

1304-2: The third node determines, based on the identifier of the data packet in the message, the data packet corresponding to the discard operation.

1304-3: The third node discards the data packet corresponding to the discard operation.

For example, a new message type may be designed. The new message type is used to indicate to perform the discard operation, and a message whose message type is the new message type carries information related to the discard operation. The message type used to indicate to perform the discard operation may alternatively be an existing message type. This is not specifically limited in this embodiment of this application.

Optionally, the message further includes a preset condition that the data packet corresponding to the discard operation meets. That the data packet meets the preset condition includes at least one of the following cases: the data packet is a data packet of a specified terminal; the data packet is a data packet received from a specified wireless backhaul node, a data packet sent to a specified wireless backhaul node, or a data packet received from a specified wireless backhaul node and sent to a specified wireless backhaul node; the data packet is a data packet born on a specified radio bearer of a specified terminal; the data packet is a data packet born on a specified PDU session of a specified terminal; the data packet is a data packet in a specified QoS flow of a specified terminal; and the data packet is a data packet carrying first indication information. The first indication information is used to indicate that the data packet needs to meet one or more of the following cases: A packet loss rate of the data packet is less than or equal to a preset threshold; the data packet is a data packet of a specified service type; and the data packet is a data packet whose reliability requirement is greater than or equal to a second preset threshold. The second preset threshold is used to distinguish from the preset threshold. That a packet loss rate is less than or equal to a preset threshold may also be described as "a packet loss rate requirement is less than or equal to a preset threshold". In this case, data packets that meet different conditions may be deleted, to meet requirements of different services.

In this case, a specific implementation of step 1304-2 may include: The third node determines, based on the data packet identifier in the message and the preset condition that the data packet corresponding to the discard operation meets, the data packet corresponding to the discard operation.

For example, when that the data packet meets the preset condition includes that the data packet is the data packet of the specified terminal, the message further includes an identifier of the specified terminal.

When that the data packet meets the preset condition includes that the data packet is the data packet received from the specified wireless backhaul node, the data packet sent to the specified wireless backhaul node, or the data packet received from the specified wireless backhaul node and sent to the specified wireless backhaul node, the message further includes an identifier of the specified wireless backhaul node.

When that the data packet meets the preset condition includes that the data packet is the data packet born on the specified radio bearer of the specified terminal, the message further includes an identifier of the specified terminal and an identifier of the specified radio bearer.

When that the data packet meets the preset condition includes that the data packet is the data packet born on the specified PDU session of the specified terminal, the message further includes an identifier of the specified terminal and an identifier of the specified PDU session.

When that the data packet meets the preset condition includes that the data packet is the data packet in the specified QoS flow of the specified terminal, the message further includes an identifier of the specified terminal and a QFI of the specified QoS flow.

When that the data packet meets the preset condition includes that the data packet is the data packet carrying first indication information, the message further includes the first indication information.

For other related descriptions of the preset condition, refer to the foregoing descriptions. Details are not described herein again. The following briefly describes a process in which the third node discards the data packet.

It should be noted that the message may further include a data packet. In this case, a receive end can determine, based on information carried in the data packet, whether the data packet meets a preset condition and a preset condition that the data packet meets. When performing the discard operation according to the message, the receive end may select, based on the information carried in the data packet and an identifier of the data packet, a data packet that needs to be discarded. For example, if the data packet meeting the preset condition is a data packet of a specified terminal, when the data packet included in the message is a data packet of the specified terminal, and the identifier of the data packet carried in the data packet is an identifier of the data packet corresponding to the discard operation, the receive end discards the data packet.

Figure 14:
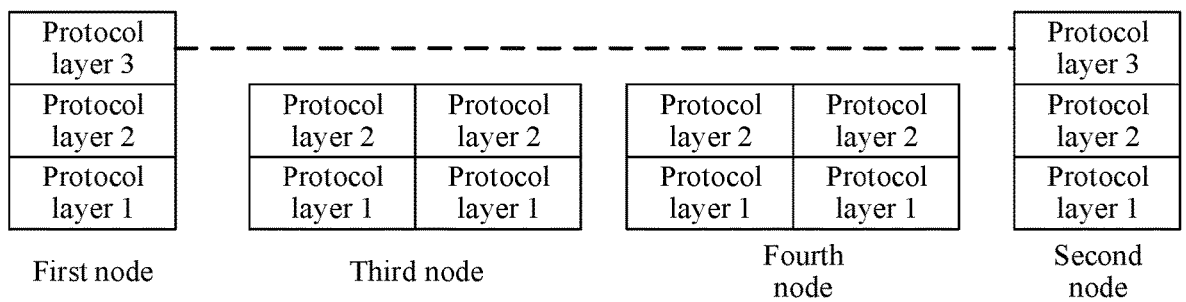
FIG. 14 is a schematic architectural diagram of a protocol stack according to an embodiment of this application.

Referring to FIG. 14, the second node and the first node each have an end-to-end peer protocol layer 3, and the second node and the first node each further have a hop-by-hop peer protocol layer 2 and protocol layer 1 via the third node and a fourth node. When sending a data packet to the third node, the first node allocates an SN (denoted as a protocol layer 3 SN) to the data packet at the protocol layer 3, and further allocates an SN (denoted as a protocol layer 2 SN) to the data packet at the protocol layer 2. The protocol layer 3 SN and the protocol layer 2 SN are in a one-to-many mapping, many-to-one mapping, or one-to-one mapping. After the first node sends the data packet to the third node (or the fourth node), the third node (or the fourth node) can obtain only the protocol layer 2 SN allocated by the first node at the protocol layer 2 to the data packet. After the data packet arrives at the second node, the second node may obtain the protocol layer 3 SN allocated by the first node at the protocol layer 3 to the data packet. Therefore, if the data packet is discarded at the protocol layer 2, the third indication information sent by the first node (or the second node) to the third node (or the fourth node) may include the protocol layer 2 SN allocated by the first node at the protocol layer 2 to the data packet. After receiving the third indication information, the third node discards the data packet whose sequence number is the protocol layer 2 SN.

The following uses an example for description. When the first node sends a data packet A to the third node, if an SN allocated to the data packet A at the protocol layer 3 is a protocol layer 3 SN 1, and SNs allocated to the data packet A at the protocol layer 2 are a protocol layer 2 SN 2 and a protocol layer 2 SN 3, both the first node and the second node (where the second node can obtain the protocol layer 3 SN 1, the protocol layer 2 SN 2, and the protocol layer 2 SN 3 after receiving the data packet A) maintains a mapping relationship between the protocol layer 3 SN1 and the protocol layer 2 SN 2 and protocol layer 2 SN 3. For example, for the maintained mapping relationship, refer to Table 1. The data packet corresponding to the protocol layer 3 SN 1 and the data packet corresponding to the protocol layer 2 SN 2 and protocol layer 2 SN 3 are both the data packet A.

If the data packet is discarded at the protocol layer 2, because third node (or the fourth node) can identify only the SN allocated by the first node at the protocol layer 2 to the data packet A, the third indication information sent by the first node (or the second node) to the third node (or the fourth node) may include the protocol layer 2 SN 2 and protocol layer 2 SN 3 allocated by the first node at the protocol layer 2 to the data packet. After receiving the third indication information, the third node discards the data packet whose sequence numbers are the protocol layer 2 SN 2 and protocol layer 2 SN 3.

TABLE 1

| SN allocated at the protocol layer 3 to the data packet A | SN allocated at the protocol layer 2 to the data packet A | Data packet |
| --- | --- | --- |
| Protocol layer 3 SN 1 | Protocol layer 2 SN 2 Protocol layer 2 SN 3 | Data packet A |

It should be noted that in the first solution, when receiving the feedback information, the first node may alternatively discard a data packet in the first node. In this case, if the feedback information includes the protocol layer 3 SN 1, the first node discards the data packet corresponding to the protocol layer 3 SN 1, or the data packet corresponding to the protocol layer 2 SN 2 and the data packet corresponding to the protocol layer 2 SN 3, where the protocol layer 2 SN 2 and the protocol layer 2 SN 3 are mapped to the protocol layer 3 SN 1. If the feedback information includes the SNs allocated to the data packet A at the protocol layer 2, when the feedback information includes the protocol layer 2 SN 2 and the protocol layer 2 SN 3, the first node discards the data packet corresponding to the protocol layer 3 SN 1 mapped to the protocol layer 2 SN 2 and protocol layer 2 SN 3. If the feedback information includes only the protocol layer 2 SN 2 or the protocol layer 2 SN 3, the first node does not discard the data packet corresponding to the protocol layer 3 SN1 mapped to the protocol layer 2 SN 2 and protocol layer 2 SN 3. The data packet deleted by the third node may be a protocol data unit of the protocol layer 2, or may be a protocol data unit of the protocol layer 3. Alternatively, the data packet deleted by the third node may be an SDU of the protocol layer 2, or may be an SDU of the protocol layer 3.

For example, the protocol layer 2 may be a protocol layer at which duplication and duplicate detection may be performed on the data packet, and may be specifically a first protocol layer, a PDCP layer, a GTP layer, or the like.

It should be noted that, in this embodiment, the first node may be a node that duplicates the data packet, and the second node may be a node that performs duplicate detection on the data packet. Further, after duplicating the data packet to obtain a plurality of same data packets, the first node splits the plurality of same data packets, and sends the plurality of same data packets to the second node through the N paths. After receiving the data packet, the second node sends the feedback information to the first node. For a subsequent method, refer to FIG. 13. When at least two of the plurality of same data packets are correctly received by the second node, the second node may be an aggregation node of the at least two data packets, and the first protocol layer may be a protocol layer at which duplication and duplicate detection are performed on the data packet. For descriptions of duplication, duplicate detection, and addition of a data packet identifier when duplication and duplicate detection are performed on the data packet at different protocol layers, refer to the foregoing embodiment.

It may be learned from the foregoing descriptions that, a protocol layer at which duplication and duplicate detection are performed on the data packet may alternatively be a PDCP layer or a GTP layer. Downlink data transmission in the first solution is used as an example below to separately describe execution processes of the data packet processing method provided in this embodiment when duplication and duplicate detection are performed on the data packet at each protocol layer.

Case A: Duplication and duplicate detection are performed on the data packet at the PDCP layer.

Scenario 1: The feedback information may be included in an RLC status report. A path between UE and a DgNB includes an IAB 2 and an IAB 1. UE and the IAB 2 accessed by the UE each have a peer RLC layer, and a data packet is duplicated at a PDCP layer of the DgNB.

Figure 15:
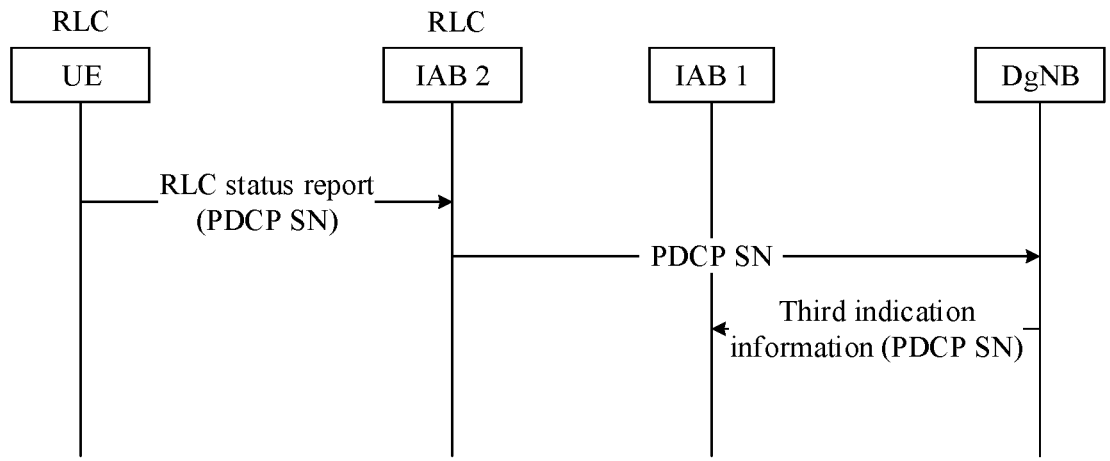
FIG. 15 to FIG. 20 are each a schematic flowchart of indicating discard of a data packet according to an embodiment of this application.

In this scenario, referring to FIG. 15, an execution process of the data packet processing method provided in this embodiment includes the following steps: (11) After obtaining a PDCP SN or an RLC SN of a correctly received data packet (which may be one or more data packets), the UE sends an RLC status report (for example, RLC acknowledgement (ACK) information) to the IAB 2, where the RLC status report includes the PDCP SN (or the RLC SN). (12) After receiving the RLC status report of the UE, the IAB 2 obtains the PDCP SN included in the RLC status report (where if the RLC status report includes the RLC SN, the IAB 2 determines the PDCP SN based on a mapping relationship between the PDCP SN and the RLC SN). (13) The IAB 2 sends the obtained PDCP SN to the DgNB. (14) After obtaining the PDCP SN, the DgNB sends third indication information to the IAB 1 and/or the IAB 2, where the third indication information includes the PDCP SN.

During specific implementation of step (13), the IAB 2 may send the PDCP SN to the DgNB via an Adapt layer (for example, by using a status report of the Adapt layer), or send the PDCP SN to the DgNB via a GTP layer, or send the PDCP SN to the DgNB via a control plane protocol stack (for example, an F1AP layer or an RRC layer) between the IAB 2 and the DgNB.

During specific implementation of step (14), the DgNB may send the third indication information to the IAB 1 and/or the IAB 2 via an Adapt layer, or send the third indication information to the IAB 1 and/or the IAB 2 via a GTP layer, or send the third indication information to the IAB 1 and/or the IAB 2 via a control plane protocol stack (for example, an F1AP layer or an RRC layer) between the DgNB and the IAB 1 and/or IAB 2.

In this scenario, to enable the IAB 2 to send the obtained PDCP SN to the DgNB, the IAB 2 needs to be configured with information about a node duplicating the data packet, or information about a node on which a peer PDCP layer of a PDCP layer of the UE is configured.

Scenario 2: The feedback information may be included in an RLC status report. A path between UE and a DgNB includes an IAB 2 and an IAB 1. UE and the DgNB each have a peer RLC layer, and a data packet is duplicated at a PDCP layer of the DgNB.

Figure 16:
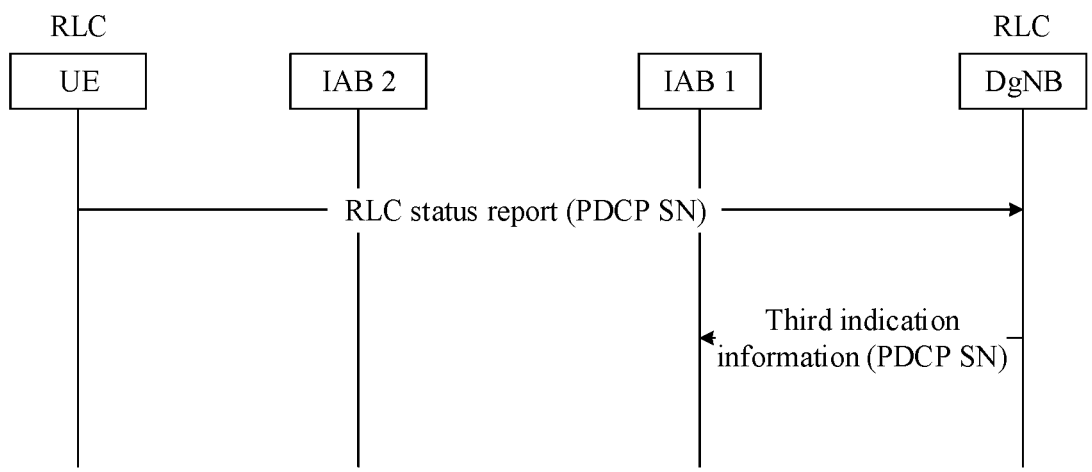

In this scenario, referring to FIG. 16, an execution process of the data packet processing method provided in this embodiment includes the following steps: (21) After obtaining a PDCP SN (or an RLC SN) of a correctly received data packet (which may be one or more data packets), the UE sends an RLC status report (for example, RLC ACK information) to the DgNB, where the RLC status report includes the PDCP SN (or the RLC SN). (22) After obtaining the PDCP SN (where if the RLC status report includes the RLC SN, the DgNB determines the PDCP SN based on a mapping relationship between the PDCP SN and the RLC SN), the DgNB sends third indication information to the IAB 1 and/or the IAB 2, where the third indication information includes the PDCP SN.

During specific implementation of step (21), the RLC status report sent by the UE to the DgNB may be forwarded to the DgNB via the IAB 1 and the IAB 2.

In this scenario, to enable the IAB 2 and the IAB 1 to send the obtained RLC status report to the DgNB, both the IAB 2 and the IAB 1 need to be configured with information about a node duplicating the data packet, or information about a node on which a peer PDCP layer of a PDCP layer of the UE is configured, or information about a node on which a peer RLC layer of an RLC layer of the UE is configured.

Scenario 3: The feedback information is included in a PDCP status report.

Figure 17:
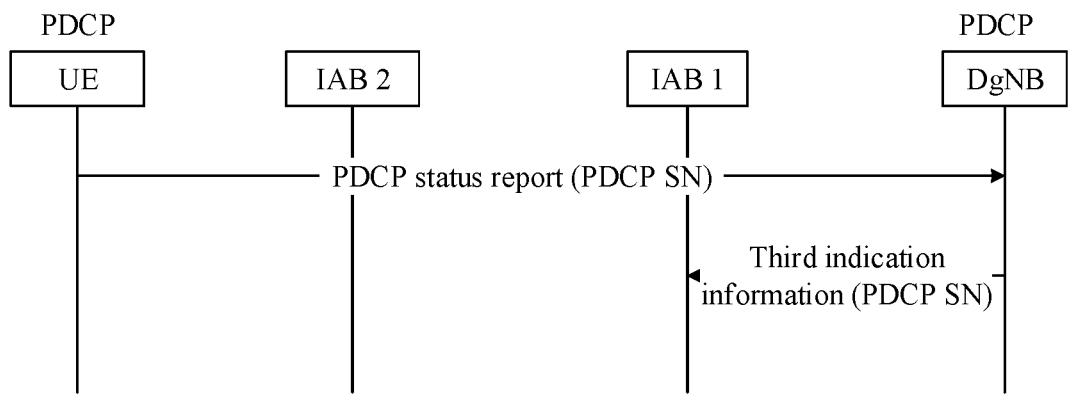

In this scenario, referring to FIG. 17, an execution process of the data packet processing method provided in this embodiment includes the following steps: (31) After obtaining a PDCP SN of a correctly received data packet (which may be one or more data packets), the UE sends a PDCP status report to the DgNB, where the PDCP status report includes the PDCP SN. (32) After obtaining the PDCP SN, the DgNB sends third indication information to the IAB 1 and/or the IAB 2, where the third indication information includes the PDCP SN.

Case B: Duplication and duplicate detection are performed on the data packet at the Adapt layer (or the GTP layer).

In this case, the IAB scenario shown in FIG. 1 is used as an example. A node duplicating the data packet is the IAB 1, a node performing duplicate detection on the data packet is the IAB 4, and an SN of a data packet exchanged between wireless backhaul nodes is an SN allocated at the Adapt layer (or the GTP layer) to the data packet, or an SN of a data packet exchanged between wireless backhaul nodes is an SN allocated at an upper-layer protocol layer of the Adapt layer (or the GTP layer) to the data packet.

An example in which an SN of a data packet exchanged between wireless backhaul nodes is an SN allocated at the Adapt layer to the data packet is used for description below. In this case, the IAB 1 and the IAB 4 each have a peer Adapt layer.

In the case B, the data packet processing method provided in this embodiment may be implemented in either of the following two manners.

Manner a: The IAB 4 periodically sends a status report to the IAB 1, to trigger discarding of a duplicate data packet.

Figure 18:
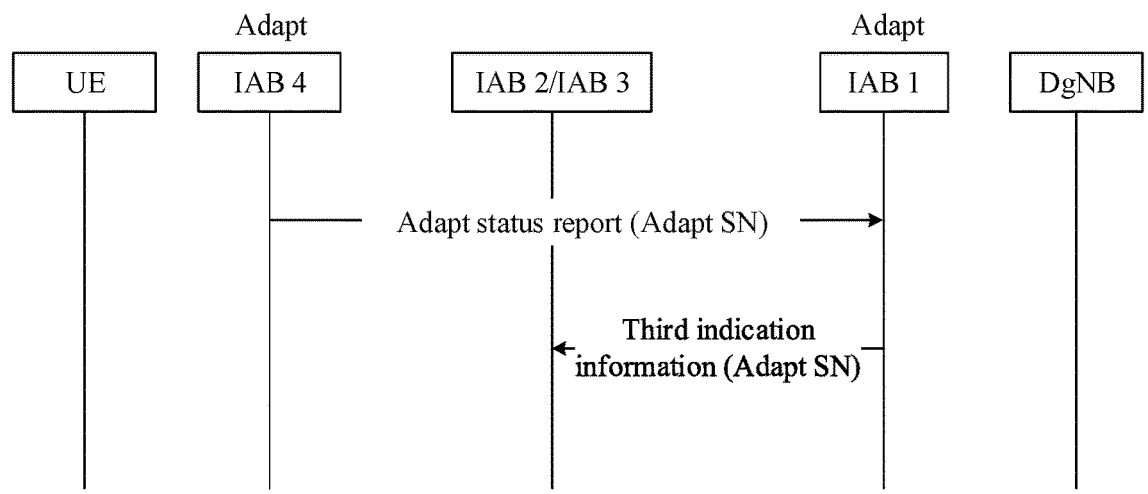

Referring to FIG. 18, an execution process of the data packet processing method provided in this embodiment includes the following steps: (41) After periodically obtaining an Adapt SN of a correctly received data packet (which may be one or more data packets), the IAB 4 sends an Adapt status report including the Adapt SN to the DgNB. (42) After obtaining the Adapt SN, the DgNB sends third indication information to the IAB 3 and/or the IAB 2, where the third indication information includes the Adapt SN.

During specific implementation of step (41), the IAB 4 may send the Adapt SN to the DgNB via the Adapt layer (for example, by using an Adapt status report), or send the Adapt SN to the DgNB via a GTP layer, or send the Adapt SN to the DgNB via a control plane protocol stack (for example, an F1AP layer or an RRC layer) between the IAB 4 and the DgNB.

During specific implementation of step (42), the third indication information may alternatively be included in the Adapt status report.

Correspondingly, a reporting periodicity may be preconfigured on the IAB 4, so that the IAB 4 periodically reports the Adapt SN of the correctly received data packet. On the IAB 4, information about a node duplicating the data packet may be further configured, so that the IAB 4 sends the Adapt SN of the correctly received data packet to the node duplicating the data packet.

Manner b: After receiving a status query information sent by the IAB 1, the IAB 4 sends a status report to the IAB 1, to trigger discarding of a duplicate data packet.

Figure 19:
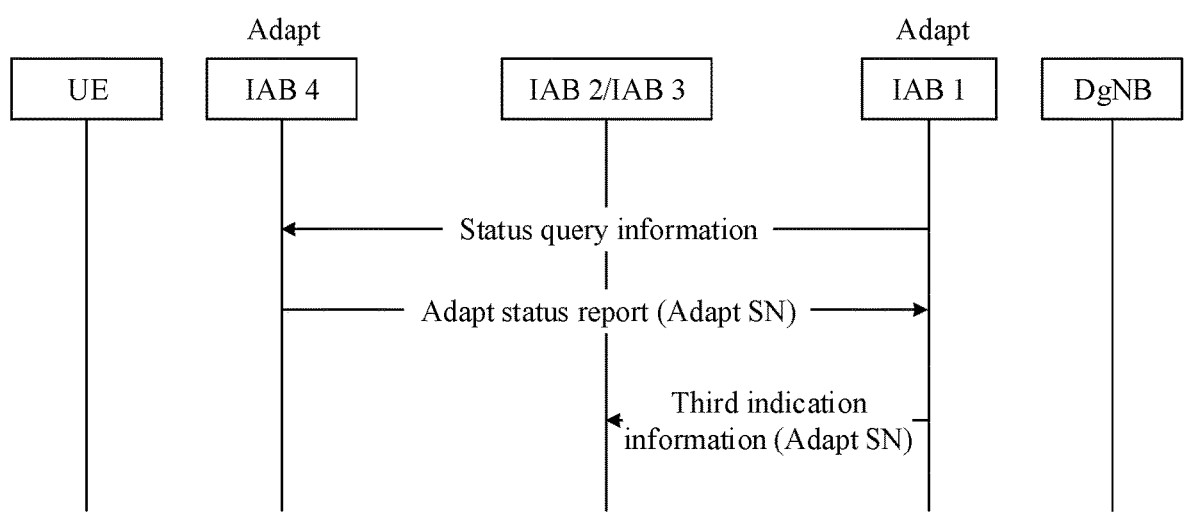

Referring to FIG. 19, an execution process of the data packet processing method provided in this embodiment includes the following steps: (51) The IAB 1 sends a status query information to the IAB 4, where the status query information is used to query receiving of the data packet by the IAB 4. (52) After receiving the status query information and obtaining an Adapt SN of a correctly received data packet (which may be one or more data packets), the IAB 4 sends an Adapt status report including the Adapt SN to the DgNB. (53) After obtaining the Adapt SN, the DgNB sends third indication information to the IAB 3 and/or the IAB 2, where the third indication information includes the Adapt SN.

Optionally, a query periodicity may be configured or generated on the IAB 1, so that the IAB 1 periodically sends the status query information to the IAB 4. When a data duplication function is activated, the IAB 1 sends the status query information to the IAB 4.

Optionally, the status query information may further include a preset condition that the data packet meets, so that the IAB 4 reports an Adapt SN of the correctly received data packet that meets the preset condition.

In addition, in the case B, in a possible implementation, the feedback information may be included in a PDCP status report/an RLC status report. Details are described below.

Figure 20:
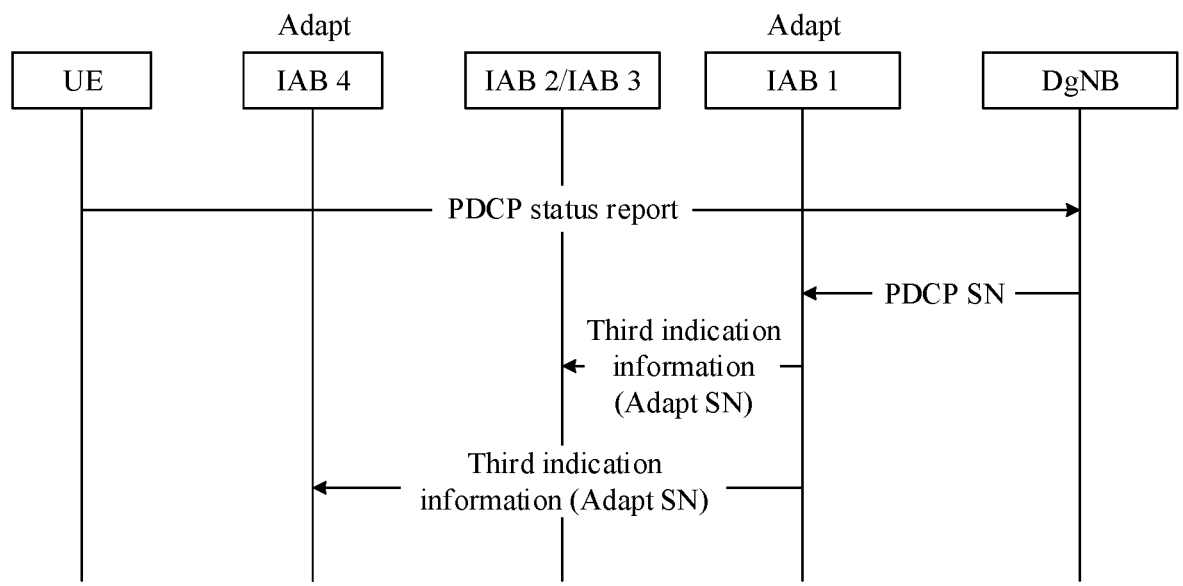

Referring to FIG. 20, an execution process of the data packet processing method provided in this embodiment includes the following steps: (61) After obtaining a PDCP SN (or an RLC SN) of a correctly received data packet (which may be one or more data packets), the UE sends a PDCP status report (or RLC ACK information) to the DgNB, where the PDCP status report (or the RLC ACK information) includes the PDCP SN (or the RLC SN). (62) After obtaining the PDCP SN (or the RLC SN), the DgNB sends the PDCP SN (or the RLC SN) to the IAB 1. (63) After obtaining the PDCP SN (or the RLC SN), the IAB 1 sends third indication information to the IAB 2 and the IAB 3, where the third indication information includes an Adapt SN mapped to the PDCP SN (or the RLC SN).

In the foregoing manner a and manner b, when reporting the Adapt SN of the correctly received data packet, the IAB 4 may include information about a specific path through which the data packet is correctly received. Therefore, the IAB 1 may send indication information only to a node on a path through which the data packet is not successfully sent to the IAB 4.

However, in the method shown in FIG. 20, because the IAB 1 cannot learn of a path through which the IAB 4 correctly receives the data packet, the IAB 1 needs to send indication information to all nodes on paths. Certainly, when the IAB 1 may obtain a path through which the IAB 4 correctly receives the data packet, the IAB 1 may also send indication information to only a node on a path through which the data packet is not successfully sent to the IAB 4.

Before step (62), the IAB 1 may notify the DgNB that the IAB 1 activates the data duplication function, so that the DgNB learns of a node to which the PDCP SN (or RLC SN) is sent.

During specific implementation of step (63), the IAB 1 may send indication information to the IAB 2, the IAB 3, and the IAB 4 via an Adapt layer, or send indication information to the IAB 2, the IAB 3, and the IAB 4 via a GTP layer, or send indication information to the IAB 2, the IAB 3, and the IAB 4 via a control plane protocol layer (for example, an F1AP layer or an RRC layer) between the IAB 2, the IAB 3, and the IAB 4.

In the foregoing embodiment, the PDCP SN is an SN allocated to the data packet when the PDCP layer processes the data packet, the RLC SN is an SN allocated to the data packet when the RLC layer processes the data packet, and the Adapt SN is an SN allocated to the data packet when the Adapt layer processes the data packet. Principles of other similar descriptions are the same.

The foregoing mainly describes the solutions in the embodiments of this application from a perspective of interaction between network elements. It may be understood that to implement the foregoing functions, the network elements such as a data transmission apparatus and the data packet processing apparatus include corresponding hardware structures and/or software modules for performing the functions. A person skilled in the art should easily be aware that, in combination with the units and algorithm steps in the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function unit division may be performed on the data transmission apparatus and the data packet processing apparatus based on the foregoing method examples. For example, each function unit may be obtained through division based on a corresponding function, or two or more functions may be integrated into one processing unit. The integrated unit may be implemented in a form of hardware, or may be implemented in a form of a software function unit. It should be noted that, in the embodiments of this application, division into the units is merely an example, is merely logical function division, and may be other division during actual implementation.

Figure 21:
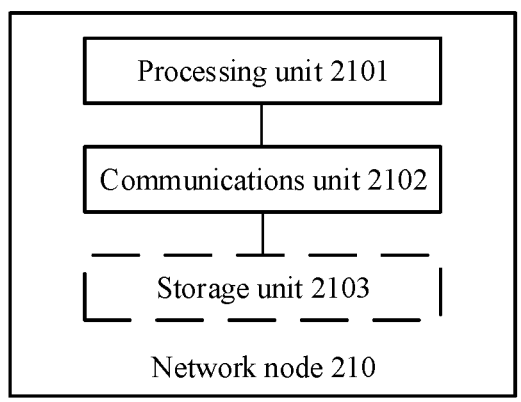
FIG. 21 is a schematic diagram of components of a network node according to an embodiment of this application.

When an integrated unit is used, FIG. 21 is a possible schematic structural diagram of a network node in the foregoing embodiments. The network node includes a processing unit 2101 and a communications unit 2102, and may further include a storage unit 2103. The schematic structural diagram shown in FIG. 21 may be used to indicate a structure of the first node, second node, or third node in the foregoing embodiments.

When the schematic structural diagram shown in FIG. 21 is used to indicate a structure of the first node in the foregoing embodiments, the processing unit 2101 is configured to control and manage an action of the first node. For example, the processing unit 2101 is configured to support the first node in performing processes 1201 to 1203 in FIG. 12, the processes 1300, 1301*a*, and 1302*a* in FIG. 13, and/or an action performed by the first node in another process described in the embodiments of this application. The communications unit 2102 is configured to support the first node in communicating with another network entity, for example, communicating with the second node shown in FIG. 12. The storage unit 2103 is configured to store program code and data of the first node.

When the schematic structural diagram shown in FIG. 21 is used to indicate a structure of the second node in the foregoing embodiments, the processing unit 2101 is configured to control and manage an action of the second node. For example, the processing unit 2101 is configured to support the second node in performing processes 1204 and 1205 in FIG. 12, the processes 1300 and 1301*a* in FIG. 13, the processes 1300, 1301*b*, and 1302*b* in FIG. 13, and/or an action performed by the second node in another process described in the embodiments of this application. The communications unit 2102 is configured to support the second node in communicating with another network entity, for example, communicating with the first node shown in FIG. 12. The storage unit 2103 is configured to store program code and data of the second node.

When the schematic structural diagram shown in FIG. 21 is used to indicate a structure of the third node in the foregoing embodiments, the processing unit 2101 is configured to control and manage an action of the third node. For example, the processing unit 2101 is configured to support the third node in performing processes 1301*a*, 1302*a*, 1303, and 1304 in FIG. 13, the processes 1301*b*, 1302*b*, 1303, and 1304 in FIG. 13, and/or an action performed by the third node in another process described in the embodiments of this application. The communications unit 2102 is configured to support the third node in communicating with another network entity, for example, communicating with the first node and/or second node shown in FIG. 13. The storage unit 2103 is configured to store program code and data of the third node.

The processing unit 2101 may be a processor or a controller. The communications unit 2102 may be a communications interface, a transceiver, a transceiver circuit, or the like. The communications interface is a general term, and may include one or more interfaces. The storage unit 2103 may be a memory.

When the processing unit 2101 is a processor, the communications unit 2102 is a communications interface, and the storage unit 2103 is a memory, the network node in this embodiment of this application may be the network node shown in FIG. 6.

When the schematic structural diagram shown in FIG. 6 is used to indicate a structure of the first node in the foregoing embodiments, the processor 601 is configured to control and manage an action of the first node. For example, the processor 601 is configured to support the first node in performing processes 1201 to 1203 in FIG. 12, the processes 1300, 1301*a*, and 1302*a* in FIG. 13, and/or an action performed by the first node in another process described in the embodiments of this application. The communications interface 604 is configured to support the first node in communicating with another network entity, for example, communicating with the second node shown in FIG. 12. The memory 603 is configured to store program code and data of the first node.

When the schematic structural diagram shown in FIG. 6 is used to indicate a structure of the second node in the foregoing embodiments, the processor 601 is configured to control and manage an action of the second node. For example, the processor 601 is configured to support the second node in performing processes 1204 and 1205 in FIG. 12, the processes 1300 and 1301*a* in FIG. 13, the processes 1300, 1301*b*, and 1302*b* in FIG. 13, and/or an action performed by the second node in another process described in the embodiments of this application. The communications interface 604 is configured to support the second node in communicating with another network entity, for example, communicating with the first node shown in FIG. 12. The memory 603 is configured to store program code and data of the second node.

When the schematic structural diagram shown in FIG. 6 is used to indicate a structure of the third node in the foregoing embodiments, the processor 601 is configured to control and manage an action of the third node. For example, the processor 601 is configured to support the third node in performing processes 1301*a*, 1302*a*, 1303, and 1304 in FIG. 13, the processes 1301*b*, 1302*b*, 1303, and 1304 in FIG. 13, and/or an action performed by the third node in another process described in the embodiments of this application. The communications interface 604 is configured to support the third node in communicating with another network entity, for example, communicating with the first node and/or second node shown in FIG. 13. The memory 603 is configured to store program code and data of the third node.

For example, the apparatus shown in FIG. 17 or FIG. 18 may be a terminal.

An embodiment of this application further provides a computer-readable storage medium, including an instruction. When the instruction is run on a computer, the computer is enabled to perform any one of the foregoing methods.

An embodiment of this application further provides a computer program product including an instruction. When the computer program product is run on a computer, the computer is enabled to perform any one of the foregoing methods.

An embodiment of this application further provides an apparatus, and the apparatus exists in a product form of a chip. The apparatus includes a processor, a memory, and a transceiver component. The transceiver component includes an input/output circuit. The memory is configured to store a computer executable instruction. The processor executes the computer executable instruction stored in the memory, to implement any one of the foregoing methods. In this case, the method provided in the embodiments of this application may be performed by a chip.

An embodiment of this application further provides a communications system, including at least a first node and a second node. The first node may be any first node provided in the foregoing embodiments, and the second node may be any second node provided in the foregoing embodiments.

The network node in the embodiments of this application may alternatively be referred to as a network device. For example, the first node may be referred to as a first device, the second node may be referred to as a second device, and the wireless backhaul node may be referred to as a wireless backhaul device.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer program instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example descriptions of this application defined by the accompanying claims, and is considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A data transmission method, comprising:
  receiving, by a first node, a data packet from an air interface, wherein the first node is a wireless backhaul node, and the wireless backhaul node is configured to provide a wireless backhaul service for a node that wirelessly accesses the wireless backhaul node;
  duplicating, by the first node, the data packet to obtain M data packets, wherein M is an integer greater than 1; and
  splitting, by the first node, the M data packets, and sending the M data packets to a second node through at least two paths, wherein when the duplicating the data packet is at a general packet radio service tunneling protocol (GTP) layer of the first node, the M data packets are sent at the GTP layer of the first node via peer GTP layers of the first node on the at least two paths, and wherein the second node is an access network device.

2. The method according to claim 1, wherein at least two of the M data packets are aggregated at the second node.

3. The method according to claim 1, wherein the duplicating, by the first node, the data packet to obtain M data packets comprises:
when determining that the data packet meets a preset condition, duplicating, by the first node, the data packet to obtain the M data packets, wherein
that the data packet meets the preset condition comprises at least one of the following cases:
the data packet is a data packet of a specified terminal;
the data packet is a data packet received from a specified wireless backhaul node, a data packet sent to a specified wireless backhaul node, or a data packet received from a specified wireless backhaul node and sent to a specified wireless backhaul node;
the data packet is a data packet born on a specified radio bearer of a specified terminal;
the data packet is a data packet born on a specified protocol data unit (PDU) session of a specified terminal;
the data packet is a data packet in a specified quality of service (QoS) flow of a specified terminal; and
the data packet is a data packet carrying first indication information, wherein the first indication information is used to indicate that a packet loss rate of the data packet is less than or equal to a preset threshold.

4. The method according to claim 3, wherein the data packet is duplicated at a first protocol layer of the first node to obtain the M data packets; and the splitting, by the first node, the M data packets, and sending the M data packets to the second node through the at least two paths comprises:
splitting, by the first node, the M data packets; and
sending, at the first protocol layer of the first node, the M data packets to the second node via peer first protocol layers of the first node on the at least two paths, wherein the first protocol layers have at least one of the following capabilities:
adding routing information that is identified by the wireless backhaul node to the data packet;
selecting routing based on the routing information that is identified by the wireless backhaul node;
adding identification information that is identified by the wireless backhaul node and that is related to a QoS requirement to the data packet;
performing QoS mapping on a link comprising the wireless backhaul node for the data packet;
adding data packet type indication information to the data packet; and
sending flow control feedback information to a node having a flow control capability.

5. The method according to claim 4, wherein that the data packet meets a preset condition comprises at least one of the following cases:
the data packet is the data packet of the specified terminal;
the data packet is the data packet received from the specified wireless backhaul node, the data packet sent to the specified wireless backhaul node, or the data packet received from the specified wireless backhaul node and sent to the specified wireless backhaul node;
the data packet is the data packet born on the specified radio bearer of the specified terminal; and
the data packet is the data packet carrying the first indication information.

6. The method according to claim 4, wherein the data packet is a data packet of a terminal, wherein a wireless backhaul node accessed by the terminal and a user plane function (UPF) serving the terminal each have a peer GTP layer, wherein the terminal and the wireless backhaul node accessed by the terminal each have a peer service data adaptation protocol (SDAP) layer and a peer packet data convergence protocol (PDCP) layer; and wherein the data packet meets a preset condition comprises at least one of the following cases:
the data packet is the data packet of the specified terminal;
the data packet is the data packet received from the specified wireless backhaul node, the data packet sent to the specified wireless backhaul node, or the data packet received from the specified wireless backhaul node and sent to the specified wireless backhaul node; and
the data packet is the data packet carrying the first indication information.

7. The method according to claim 1, wherein before the duplicating, by the first node, the data packet to obtain M data packets, the method further comprises:
receiving, by the first node, second indication information, wherein the second indication information is used to indicate whether to activate a data duplication function of the first node; and
when the second indication information is used to indicate to activate the data duplication function of the first node, activating, by the first node, the data duplication function of the first node according to the second indication information.

8. A data transmission apparatus, comprising at least one processor, one or more memories coupled to the at least one processor and storing programming instructions for execution by the at least one processor to cause the apparatus to:
receive a data packet from an air interface, wherein the apparatus is a wireless backhaul node, and the wireless backhaul node is configured to provide a wireless backhaul service for a node that wirelessly accesses the wireless backhaul node;
duplicate the data packet to obtain M data packets, wherein M is an integer greater than 1; and
split the M data packets; and
send the M data packets to a second node through at least two paths wherein when duplicating the data packet at a general packet radio service tunneling protocol (GTP) layer of the apparatus, the M data packets are sent at the GTP layer of the apparatus via peer GTP layers of the apparatus on the at least two paths, and wherein the second node is an access network device.

9. The apparatus according to claim 8, wherein at least two of the M data packets are aggregated at the second node.

10. The apparatus according to claim 8, wherein the programming instructions, when executed by the at least one processor, cause the apparatus to:
when the apparatus determines that the data packet meets a preset condition, duplicate the data packet to obtain the M data packets;
wherein that the data packet meets the preset condition comprises at least one of the following cases:
the data packet is a data packet of a specified terminal;
the data packet is a data packet received from a specified wireless backhaul node, a data packet sent to a specified wireless backhaul node, or a data packet received from a specified wireless backhaul node and sent to a specified wireless backhaul node;

the data packet is a data packet born on a specified radio bearer of a specified terminal;

the data packet is a data packet born on a specified protocol data unit (PDU) session of a specified terminal;

the data packet is a data packet in a specified quality of service (QoS) flow of a specified terminal; and the data packet is a data packet carrying first indication information, wherein the first indication information is used to indicate that a packet loss rate of the data packet is less than or equal to a preset threshold.

11. The apparatus according to claim 10, wherein the data packet is duplicated at a first protocol layer of the apparatus to obtain the M data packets; and the programming instructions, when executed by the at least one processor, cause the apparatus to:

split the M data packets; and send, at the first protocol layer of the apparatus, the M data packets to the second node via peer first protocol layers of the apparatus on the at least two paths, wherein the first protocol layers have at least one of the following capabilities:

adding routing information that is identified by the wireless backhaul node to the data packet;

selecting routing based on the routing information that is identified by the wireless backhaul node;

adding identification information that is identified by the wireless backhaul node and that is related to a QoS requirement to the data packet;

performing QoS mapping on a link comprising the wireless backhaul node for the data packet;

adding data packet type indication information to the data packet; and sending flow control feedback information to a node having a flow control capability.

12. The apparatus according to claim 11, wherein that the data packet meets a preset condition comprises at least one of the following cases:

the data packet is the data packet of the specified terminal;

the data packet is the data packet received from the specified wireless backhaul node, the data packet sent to the specified wireless backhaul node, or the data packet received from the specified wireless backhaul node and sent to the specified wireless backhaul node;

the data packet is the data packet born on the specified radio bearer of the specified terminal; and the data packet is the data packet carrying the first indication information.

13. The apparatus according to claim 8, wherein the programming instructions, when executed by the at least one processor, cause the apparatus to:

receive second indication information, wherein the second indication information is used to indicate whether to activate a data duplication function of the apparatus; and when the second indication information is used to indicate to activate the data duplication function of the apparatus, wherein the apparatus is configured to activate the data duplication function of the apparatus according to the second indication information.

14. A data transmission apparatus, comprising at least one processor, one or more memories coupled to the at least one processor and storing programming instructions for execution by the at least one processor to cause the apparatus to:

receive at least two data packets through at least one path, wherein the apparatus is a wireless backhaul node, wherein the wireless backhaul node is configured to provide a wireless backhaul service for a node that wirelessly accesses the wireless backhaul node, and wherein the at least one path is a path between the apparatus and a first node; and perform duplicate detection on at least one of the at least two data packets, wherein when the at least one of the at least two data packets is a data packet received by the apparatus at a general packet radio service tunneling protocol (GTP) layer of the apparatus via a peer GTP layer of the apparatus, the duplicate detection is performed on the at least one of the at least two data packets at the GTP layer of the apparatus, and wherein the first node is an access network device.

15. The apparatus according to claim 14, wherein at least one data packet is a data packet that is in the at least two data packets and that meets a preset condition, wherein that the data packet meets the preset condition comprises at least one of the following cases:

the data packet is a data packet of a specified terminal;

the data packet is a data packet received from a specified wireless backhaul node, a data packet sent to a specified wireless backhaul node, or a data packet received from a specified wireless backhaul node and sent to a specified wireless backhaul node;

the data packet is a data packet born on a specified radio bearer of a specified terminal;

the data packet is a data packet born on a specified protocol data unit (PDU) session of a specified terminal;

the data packet is a data packet in a specified quality of service (QoS) flow of a specified terminal; and the data packet is a data packet carrying first indication information, wherein the first indication information is used to indicate that a packet loss rate of the data packet is less than or equal to a preset threshold.

16. The apparatus according to claim 15, wherein the at least one data packet is a data packet received by the apparatus at a first protocol layer of the apparatus via a peer first protocol layer of the apparatus; and the programming instructions, when executed by the at least one processor, cause the apparatus to:

perform the duplicate detection on at least one of the at least two data packets at the first protocol layer of the apparatus, and wherein the first protocol layers have at least one of the following capabilities:

adding routing information that is identified by a wireless backhaul node to the data packet;

selecting routing based on the routing information that is identified by the wireless backhaul node;

adding identification information that is identified by the wireless backhaul node and that is related to a QoS requirement to the data packet;

performing QoS mapping on a link comprising the wireless backhaul node for the data packet;

adding data packet type indication information to the data packet; and sending flow control feedback information to a node having a flow control capability.

17. The apparatus according to claim 16, wherein that the data packet meets the preset condition comprises at least one of the following cases:

the data packet is the data packet of the specified terminal;

the data packet is the data packet received from the specified wireless backhaul node, the data packet sent to the specified wireless backhaul node, or the data packet received from the specified wireless backhaul node and sent to the specified wireless backhaul node;

the data packet is the data packet born on the specified radio bearer of the specified terminal; and the data packet is the data packet carrying the first indication information.

\* \* \* \* \*